United States Patent [19]

Seagrave et al.

[11] Patent Number: 5,544,140
[45] Date of Patent: * Aug. 6, 1996

[54] STORAGE MEDIUM AND APPARATUS AND METHOD FOR RECOVERING INFORMATION FROM SUCH MEDIUM BY OVERSAMPLING

[75] Inventors: Charles G. Seagrave, San Rafael; Martin J. Richards, Redwood City; Douglas E. Mandell, San Francisco; Mark L. Atherton, San Bruno, all of Calif.

[73] Assignee: Dolby Laboratories Licensing Corporation, San Francisco, Calif.

[ * ] Notice: The term of this patent shall not extend beyond the expiration date of Pat. No. 5,347,509.

[21] Appl. No.: 937,887

[22] PCT Filed: Feb. 4, 1992

[86] PCT No.: PCT/US92/00898

§ 371 Date: Sep. 30, 1992

§ 102(e) Date: Sep. 30, 1992

Related U.S. Application Data

[63] Continuation-in-part of Ser. No. 650,571, Feb. 4, 1991, abandoned, and Ser. No. 710,174, Jun. 4, 1991, abandoned.

[51] Int. Cl.$^6$ .................................................. G11B 5/00
[52] U.S. Cl. ................................................ 369/59; 360/32
[58] Field of Search .............................. 360/48, 51, 32, 360/40; 369/53, 59, 60; 375/1, 55; 348/443, 310; 235/456, 494

[56] References Cited

U.S. PATENT DOCUMENTS

| | | | |
|---|---|---|---|
| 3,342,978 | 9/1967 | Cameron et al. | 235/61.3 |
| 3,660,641 | 5/1972 | Levasseur | 235/61.12 N |
| 3,932,032 | 1/1976 | Weinstein | 352/11 |
| 4,488,679 | 12/1984 | Bockholt et al. | 235/469 |
| 4,600,280 | 7/1986 | Clark | 352/37 |
| 4,603,099 | 7/1986 | Drexler | 430/140 |
| 4,659,198 | 4/1987 | Beauviala et al. | 252/92 |
| 4,760,247 | 7/1988 | Keane et al. | 235/454 |
| 4,786,792 | 11/1988 | Pierce et al. | 235/456 |
| 4,874,936 | 10/1989 | Chandler et al. | 235/454 |
| 4,893,921 | 1/1990 | Beauviala | 352/92 |
| 4,939,354 | 7/1990 | Priddy | 235/456 |
| 5,053,609 | 10/1991 | Priddy et al. | 235/456 |
| 5,077,753 | 12/1991 | Graw, Jr. et al. | 375/1 |
| 5,095,392 | 3/1992 | Shimazaki et al. | 360/32 X |
| 5,185,736 | 2/1993 | Tyrrell et al. | 370/55 |
| 5,194,996 | 3/1993 | Shores | 360/48 |
| 5,202,760 | 4/1993 | Tourtier et al. | 358/310 X |
| 5,229,986 | 7/1993 | Mizokami et al. | 369/59 |
| 5,262,858 | 11/1993 | Butera et al. | 348/443 |
| 5,347,509 | 9/1991 | Goldberg et al. | 369/275.3 |

FOREIGN PATENT DOCUMENTS

| | | |
|---|---|---|
| 0130391 | 1/1985 | European Pat. Off. . |
| 0227380 | 7/1987 | European Pat. Off. . |
| 0336778 | 10/1989 | European Pat. Off. . |
| 9105335 | 4/1991 | WIPO . |

Primary Examiner—John Shepperd
Assistant Examiner—Le T. Minh

[57] ABSTRACT

The invention relates generally to a storage medium carrying symbols representing digital information, the recovery from a storage medium of symbols representing digital information and the determination of the digital information represented by such symbols. More particularly, the invention relates to storage media carrying the symbols in two dimensions and to the recovery of such symbols by oversampling in two dimensions. While the invention has many applications, the invention is described in connection with preferred embodiments in which the symbols are carried by and recovered from an optical-storage medium, namely, motion picture film, the symbols representing digital information into which motion picture soundtrack and related information is encoded.

34 Claims, 9 Drawing Sheets

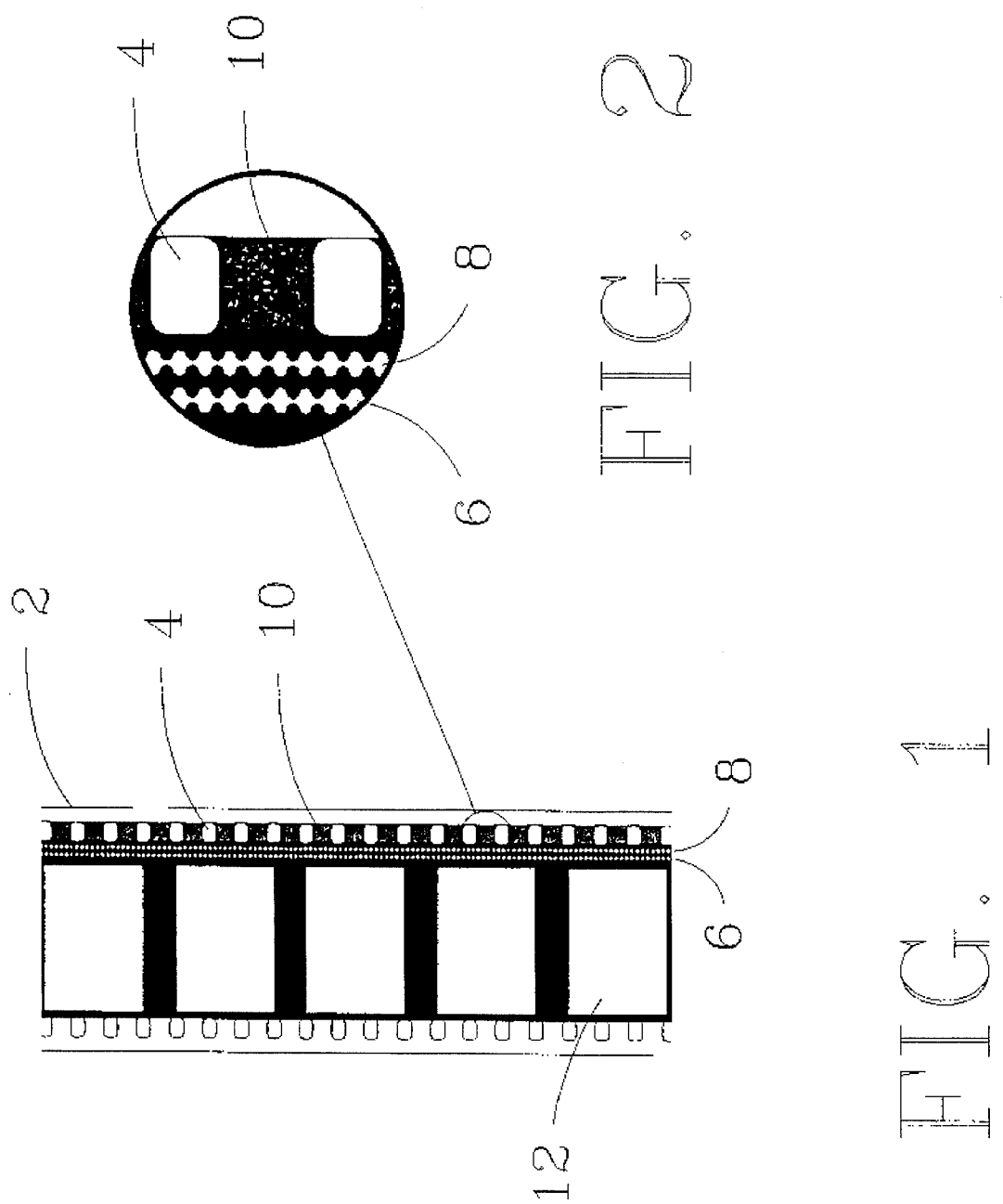

STORAGE MEDIUM AND APPARATUS AND METHOD FOR RECOVERING INFORMATION FROM SUCH MEDIUM BY OVERSAMPLING

CROSS-REFERENCE TO RELATED APPLICATIONS

This is a continuation-in-part of U.S. patent application Ser. No. 07/710,174 filed Jun. 4, 1991, now abandoned, and a continuation-in-part of U.S. patent application Ser. No. 07/650,571 filed Feb. 4, 1991, now abandoned.

TECHNICAL FIELD

The invention relates generally to a storage medium carrying symbols representing digital information, the recovery from a storage medium of symbols representing digital information and the determination of the digital information represented by such symbols. More particularly, the invention relates to storage media carrying the symbols in two dimensions and to the recovery of such symbols by oversampling in two dimensions. While the invention has many applications, the invention is described in connection with preferred embodiments in which the symbols are carried by and recovered from an optical-storage medium, namely, motion picture film, the symbols representing digital information into which motion picture soundtrack and related information is encoded.

BACKGROUND ART

The last two decades have seen an explosion of interest in motion picture sound, in large part triggered by the ever-increasing quality of home high-fidelity systems. There is a continuing interest in new and improved motion picture soundtrack release formats.

Most films today are released with either conventional monophonic ("Academy") optical soundtracks or with stereo-variable-area (SVA) optical soundtracks with analog noise reduction, which are most widely known under the trademark "Dolby Stereo." "Dolby" and "Dolby Stereo" are trademarks of Dolby Laboratories Licensing Corporation.

The Academy format, originated in the 1930's, suffers from an extremely poor frequency response. Even though the soundtrack itself may extend to beyond 8 kHz, other elements within the recording and playback chain associated with the format restrict the bandwidth such that the audience will hear vary little above 4 or 5 kHz. In addition, the Academy format has relatively high distortion, a barely adequate signal-to-noise ratio and perhaps the greatest shortcoming of all: it is only monophonic (mono).

Dolby stereo is possibly the first motion picture optical soundtrack format which can truly be called high fidelity, and which is available to all theaters. Even though magnetic soundtracks (on 35 mm and 70 mm film) as long ago as the 1950's had moderately acceptable specifications, the high release print costs were in large part responsible for very few audiences ever hearing the magnetic versions. Stereo optical prints, on the other hand, have no premium cost above conventional optical soundtracks, and this has resulted in wide availability. A large majority of Dolby Stereo films are released "single inventory"—that is, a separate monophonic Academy print is not released because the producer considers the Dolby Stereo film to provided acceptable audible compatibility when played in Academy mono equipped theaters.

The Dolby Stereo optical soundtrack format provides four channels of information (left, center, right and surround) matrix encoded onto the two SVA optical film soundtracks. The original Dolby Stereo format employs Dolby A-type analog audio noise reduction. In the mid-1980's Dolby Laboratories introduced an improved analog audio processing system, Dolby SR, and that system has been applied to many Dolby Stereo films. The use of Dolby SR results in a dramatic improvement in volume range and frequency response. Even in a quiet and well-equipped theater, optical print noise is below the theater's ambient noise floor, while undistorted sound peaks are amply loud for most startling special effects. Frequency response extends to 16 kHz.

In spite of these advances in analog soundtrack fidelity, film soundtracks have long been considered a candidate for digital coding. Digital audio encoding has become integrated into the mainstream of both consumer and professional use. The Compact Disc ha earned wide consumer acceptance. As a result, a digital soundtrack would benefit from the popular conception that digital sound in inherently better, an undeniable added attraction at the theater box office.

In addition, a digital soundtrack may provide increased resistance to audible degradation of the soundtrack caused by the wear and tear of commercial exhibition, and can diminish the audible effects of projector wow and flutter. Multiple channels could be supplied on an optical soundtrack for both 35 mm and 70 mm print formats. The soundtrack's frequency and dynamic range specifications could exceed even that of current Dolby Stereo formats.

The recent announcement of two digitally-encoded optical soundtrack formats for 35 mm and 70 mm film, respectively, have reaffirmed the interest which exists in using digital soundtracks to improve motion picture sound in the theater. See "Digital Optical Sound on 35 mm Motion-Picture Film" by Syd Wiles et al, *SMPTE Journal*, November 1990, pp. 899–908 and "The Advent of Cinema Digital Sound" by Clyde McKinney, *The Film Journal*, August 1990, pp. 22 & 43 (a 70 mm system). Unfortunately, both of these formats locate the digital soundtrack information in the area formerly occupied by the analog soundtracks, making the these new digital formats incompatible with existing analog film formats and existing analog projection equipment.

DISCLOSURE OF INVENTION

In accordance with the teachings of the present invention, a new apparatus and method are provided for recovering symbols representing digital information carried by a storage medium. In a further aspect of the invention, a new apparatus and method are provided for determining the digital information represented by the recovered symbols. According to yet a further aspect of the invention, a new configuration of storage medium in provided for carrying symbols representing digital information.

The symbols may be any differentiable symbols capable of representing digital information and capable of being carried in two dimensions by a storage medium. In its broadest aspects, the invention contemplates the use of any medium capable of carrying differentiable symbols encoded two-dimensionally on the medium.

Many prior art techniques for digital information storage and recovery relay upon control or timing information carried by the storage medium apart from the digital information, referred to herein as "flags." Flags include information that may (1) establish the relationship between time and distance across a storage medium, (2) identify segments of digital information, (3) provide a structure in which digital information may be stored, (4) establish the size and/or storage density of discrete information-carrying areas, or (5) establish the bounds and/or orientation of information-carrying areas. Some examples of these flags include so-called timing tracks, track indexes on random access storage media, media alignment marks, and digital symbols carrying size and/or storage density indicia.

Terms such as "encoded two-dimensionally" or "two-dimensional encoding," as used herein with respect to symbols, mean that the information represented by the symbols can be determined from only the two-dimensional positioning of the symbols relative to either one another or to any other reference on the medium, and any differentiable characteristic intrinsic to the symbols; there is not need for any flag or flags relating to the symbols or their positions with respect to the medium itself. Examples of a differentiable characteristic intrinsic to the symbols include optical reflectivity or transmissivity, shape, color, size, and orientation. The combination of a differentiable characteristic and relative position, or a locational characteristic, is referred to herein as a differentiable-locational characteristic.

Examples of storage media capable of carrying differentiable symbols encoded two-dimensionally include optical-storage medium such as paper, discs, or film; and magnetic-storage media such as paper, tape, or discs.

The invention is particularly advantageous for use with practical storage media in which the position or location and the differentiable characteristics of the symbols are subject to statistical variations, i.e., they are not uniform. For optical-storage media, nonuniformity of differentiable-location characteristics of the symbols can be caused by optical and locational variations or distortions in the optical-storage medium itself, or by inconsistencies in the application of the symbols to the medium. Examples of optical variations or distortions in an optical storage medium such as motion picture film stock include over- or under-developing, and surface defect such as scratches or smudges. Examples of locational variations in motion picture film includes stretching in one or more dimensions, and variations in the location of symbols with respect to the film. Examples of inconsistencies in application of symbols to the media include variation in the position of the symbols with respect to the boundaries of an underlying medium, and variations in the density and/or shape of the symbols themselves.

The symbols carried by the storage medium are oversampled in two dimensions. Oversampling is sampling at a rate higher than the Nyquist sampling rate. In preferred embodiments, two adjacent symbols constitute a complete cycle of data; therefore, sampling at a rate higher than the Nyquist rate means sampling at a rate higher than exactly once per symbol.

Although the invention in its broadest aspects contemplates the use of any means for oversampling the symbols, the invention is particularly advantageous for use with practical sensing arrangements such as optical sensing arrangements in which the optical characteristics and/or location characteristics of the symbols, referred to herein as optical-locational characteristics, are distorted by the sensing arrangement. Such distortion can be caused by optical and locational variations or distortions in the optical sensing arrangement itself, or by variations in the relative location and/or motion of the optical-storage medium with respect to the optical sensing arrangement. Examples of optical and locational variations in a sensing arrangement for motion picture film include lenses which are out of focus or which have optical aberrations, and lateral and/or azimuthal misalignment of optical sensing elements. Examples of variations in relative location and/or motion of a medium such as motion picture film with respect to a sensing arrangement include horizontal motion or weaving within an optical plane, horizontal motion and twisting of the film out of an optical plane, rotational or azimuthal motion, short-term fluctuations in film speed sometimes called jitter or flutter, and longer-term fluctuations in film speed.

A representation of the symbols carried by the storage medium is derived from the samples produced by oversampling the symbols in two dimensions. This representation of the symbols carried by the storage medium constitutes a two-dimensional image representation.

Filtering in two dimensions, in the nature of reconstruction filtering or image enhancement, may be applied as needed to improve the resolution of the two-dimensional image representation so that it is suitable for locating the symbols and determining, within a desired accuracy, the digital value of the digital information which they represent. The requirements for reconstruction filtering or image processing are inversely related to the amount of oversampling of the symbols; oversampling at a sufficiently high rate reduces and may eliminate the need for image enhancement filtering. In practical optical-storage media systems, depending on the cost and availability of electro-optical and electronic devices, the system designer may be required to balance the amount of oversampling and the resources required to perform the oversampling against the amount of image enhancement filtering and the resources required to perform the filtering.

The digital value of the digital information represented by each symbol, referred to herein as the "symbol value," is recovered from the image representation of the symbols by examining, in an optical-storage media system for example, optical-locational characteristics of the image representation. Symbol values are recovered by examining other differentiable-locational characteristics if another type of storage media is used. Optical characteristics, or other differentiable characteristics in the case of non-optical storage media, are compared to one or more references; for example, optical characteristics may be compared to light transmissivity or reflectivity thresholds. Locational characteristics are compared to one or more references such as, for example, a set of anticipated relative symbol locations.

In the preferred embodiment, the derivation of the image representation and recovery of the symbol values is done in the digital domain and may be implemented in which or in part using general purpose digital signal processing integrated circuits ("chips") and/or application-specific digital circuitry. In principle, such derivation of the image representation and recovery of the symbol values may be done wholly or partly in the analog domain, although probably at a greater cost due to increased complexity.

In the preferred embodiment of the invention for motion picture soundtrack applications, the digital information constitutes bytes of digital information in a binary bit stream; the bit stream represents a plurality of motion picture soundtrack channels and, optionally, other information useful for the playback of a motion picture film.

The digital information represented by the symbols may itself be encoded. For example, the digital information may be an encoded representation of other analog and/or digital information which has been subject to processing such as data compression, error correction encoding, randomizing, and formatting. The manner in which the digital information is encoded does not form a part of this invention, nor does this invention relate to the recovery or reproduction of that which is represented by encoded digital information.

The invention allows the recovery of a densely packed array of small symbols carried by the storage medium and the determination of the digital information represented by the symbols entirely by electro-optical and electronic means without requiring precise positioning techniques. The symbols carried by the storage medium need only be within the sensing range of the sensing means. There are not requirements for close alignment between the storage medium and the sensing means nor are there requirements for close synchronization, clocking or tracking of the storage medium. No timing information or "flags" need be carried by the storage medium. In addition to simplifying the process of information recovery, the absence of clock, timing or "flag" information makes more information carrying area of the storage medium available for other purposes.

The image representation recovered in accordance with the present invention is a representation of the differentiable-locational characteristics of the symbols carried by the storage medium which allows examination of two-dimensional positional information of the symbols.

Although the invention has many applications, it is described in connection with the preferred embodiment wherein the storage medium is an optical-storage medium in the form of a web, namely motion picture film stock carrying optically recorded symbols representing digital information, and recovery of the symbols and digital information represented by the symbols is performed by a portion of a digital motion picture film soundtrack playback system.

In the preferred embodiment, symbols representing digital information are carried by the motion picture film stock in a series of discrete segments in the form of two-dimensional blocks of symbols. In principle, such segments may be of any convenient length or size. The invention is read by oversampling the blocks in two dimensions, deriving a two-dimensional image representation of each block of symbols, and determining the digital value represented by each symbol in the block.

In accordance with the basic principles of the invention, there are not stringent requirements for any special alignment or synchronization of the film with respect to the optical sensing means, nor are there requirements for clocking or tracking information on the film. The image representations of the blocks of symbols are two-dimensional image representations which permit the determination of digital values represented by the symbols to be made on the basis of the symbol's optical transmissivity and location without regard to timing or "flags."

The invention operates in cooperation with conventional motion picture projectors and results in a system that is highly robust in the sense that is resistant to 1) variations in film speed, 2) film jitter, 3) film weave, 4) film azimuth errors, 5) film stretch, 6) dirt and scratches on the film, 7) variations in optical transmissivity, 8) variations in brightness of the light source for the optical sensing means, and 9) variations in the sensitivity of the optical sensing means. The system is also resistant to variations in the positions of the film with respect to the optical sensor by which the symbols carried by the film are optically sensed.

In the preferred embodiment, the blocks of symbols are located between the sprocket hole perforations on at least one side of the motion picture film stock and are generally of rectangular shape. If the digital information is placed on only one side of the film, the digital information is preferably located on the side on which the analog soundtracks are recorded. The area between motion picture film sprocket hole perforations is sometimes referred to in this document as the interperforation area or simply as an "interperf area" or "interperf."

Each of the blocks may have one or more alignment patterns or references to assist locating the symbols, but the alignment patterns or references are not necessary. The use of alignment patterns or references may allow determining the location of the symbols using lower amounts of processing power.

The terms "alignment pattern" and "pattern" are used herein to mean any reference that can be used to assist aligning and/or locating the information-carrying symbols; they should not be understood to include any limitation implied by the word "pattern."

If alignment patterns are employed, preferably they should have autocorrelation properties such that low autocorrelation values result when the pattern is not congruent with itself. A cross-multiplied Barker code may be used. In the preferred embodiment, there are four alignment patterns, one at each corner of each block of symbols. For simplicity in processing as described below, the four alignment patterns are identical; in principle, they may differ from one another. In the preferred embodiment each of the alignment patterns is a 7-by-7 array of symbols and each block of symbols, including the alignment patterns, is a 76-by-76 array of symbols.

The symbols representing digital information are in the form of optically differentiable symbols. In the preferred embodiment, the digital information represented by the symbols is binary. Thus, the symbols need have only two states, such as transmissive and opaque, or reflective and non-reflective. In the preferred embodiment, the symbols are read by sensing the amount of light they pass transmissively. In other embodiments, the symbols may be read by sensing the amount of light they reflect; the form in which the symbols are carried by the optical-storage medium may be changed as necessary to facilitate sensing reflective light.

Other embodiments of the invention may use symbols with various types of differentiable characteristics. For example, magnetic sensing arrangements can detect different magnetic field orientations; tactile sensing arrangements can detect different heights; electrical sensing arrangements can detect different levels of conductivity, capacitance, or inductance; and optical sensing arrangements can detect different colors and shapes.

In principle, the symbols could represent digital information other than binary information by using multiple differentiable characteristics. For example, each symbol may be given any of a plurality of transmissivity or reflectivity levels, colors or shapes, or some combination of such characteristics.

In the preferred embodiment, each of the symbols is generally square in shape. For use in motion picture application, the size of the symbols preferably is sufficiently large so that high-speed motion picture film printing techniques can be used without encountering resolution problems. In the preferred embodiment, the side of each square symbol is on the order of 32 microns.

In the preferred embodiment, the symbols are located relative to one another in such a manner that their centers define the intersections of an orthogonal grid having equally spaced lines. For other embodiments, the relative location of the symbols is not limited to such a configuration.

In the preferred embodiment, the central portion of each block of symbols is a 12-by-12 array of symbols which carries no soundtrack or auxiliary information. The central portion is available for other data carrying purposes, for a further alignment pattern, or it may be designated as an area not to be used to carry any useful information.

In the preferred embodiment, the film also carries two conventional SVA soundtracks. The existing analog soundtrack locations remain unaltered so that the film may carry both the conventional analog soundtrack information and the new digital information. The arrangement thus provides for full compatibility with existing analog motion picture film formats.

Alternatively, by locating the symbols between the sprocket hole perforations on both sides of the film and/or by also locating the symbols between the sprocket holes and the edges of the film, it may be possible to reduce or eliminate any requirement for bit rate reduction, to provide for additional signals to enhance the system's multidimensional sound properties, and/or provide for other purposes. As a further alternative, if compatibility with existing motion picture analog soundtracks is forsaken, the symbols representing digital information may be located in the area used by conventional analog soundtracks. In that case, the symbols may be grouped into one or more blocks on any convenient length. In addition, if desired, the symbols may be carried across the entire motion picture film area by known fluorescent-optical techniques.

In a proposed commercial product embodying the present invention, the digital information represents multiple soundtrack channels and auxiliary information. Preferably, the digital information comprises five 20 kHz bandwidth audio channels: left, center, right, left surround and right surround; a subwoofer channel of about 125 Hz bandwidth; and two auxiliary channels of digital data, one at 2400 bits per second and the second at 9600 bits per second. The audio and digital channels are subject to processing including error detection/correction encoding and bit-rate reduction or data compression.

As mentioned above, the invention is applicable to applications, media and storage techniques other than those of the preferred embodiment. For example, the invention may be employed to store and recover information from paper using optically or magnetically differentiable symbols by using electrostatically applied toner or magnetic ink, respectively. Very large amounts of information such as text, music, voice, video images, or digital data could be stored on paper and read simply and inexpensively using ordinary noncoherent light sources.

BRIEF DESCRIPTION OF DRAWINGS

FIG. 1 is a view of a recorded 35 mm motion picture (cinematographic) film carrying both conventional analog soundtracks and blocks of symbols carrying digital information according to the present invention.

FIG. 2 is an expanded view of a portion of FIG. 1 in the region of the film sprocket holes and one of the analog soundtracks.

MODES FOR CARRYING OUT THE INVENTION

I. Medium

Referring now to FIG. 1 of the drawings, the storage medium carrying symbols representing digital information is shown in the form of a motion picture (cinematographic) film 2. Although these figures depict the preferred embodiment of a medium in the form of a 35 mm motion picture film which is conventional except for the addition of the symbols representing digital information, the storage medium aspect of the invention is applicable to other film sizes and formats including 70 mm motion picture film, and is also applicable to other media including optical-storage media.

Figure 3:
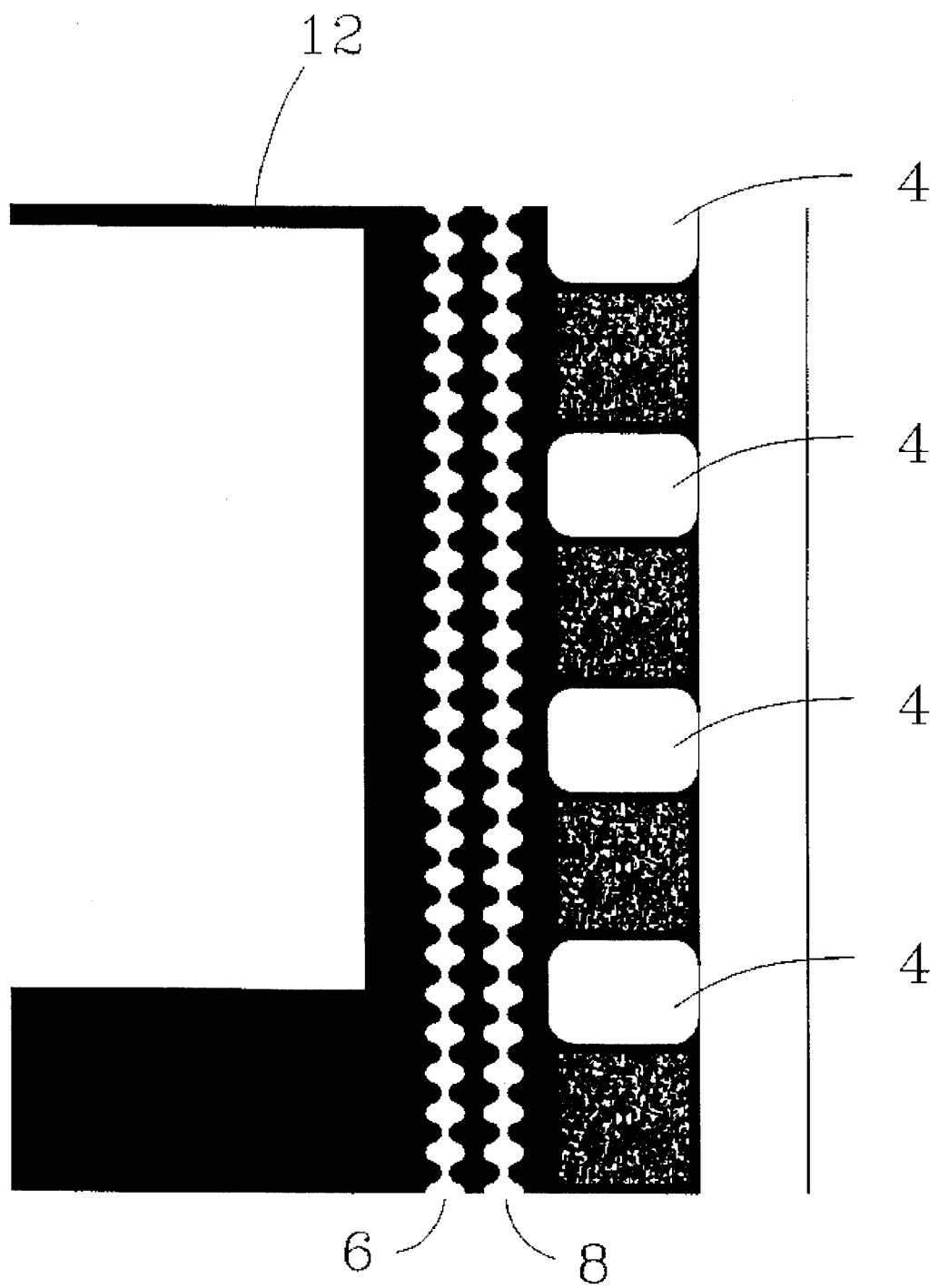
FIG. 3 is a view similar to that of FIG. 2.

FIGS. 2 and 3 show in more detail a portion of the film 2 including sprocket holes 4, two analog SVA or dual-bilateral monophonic tracks 6 and 8, and blocks of symbols 10. FIG. 3 also shows a portion of picture area 12.

Figure 4:
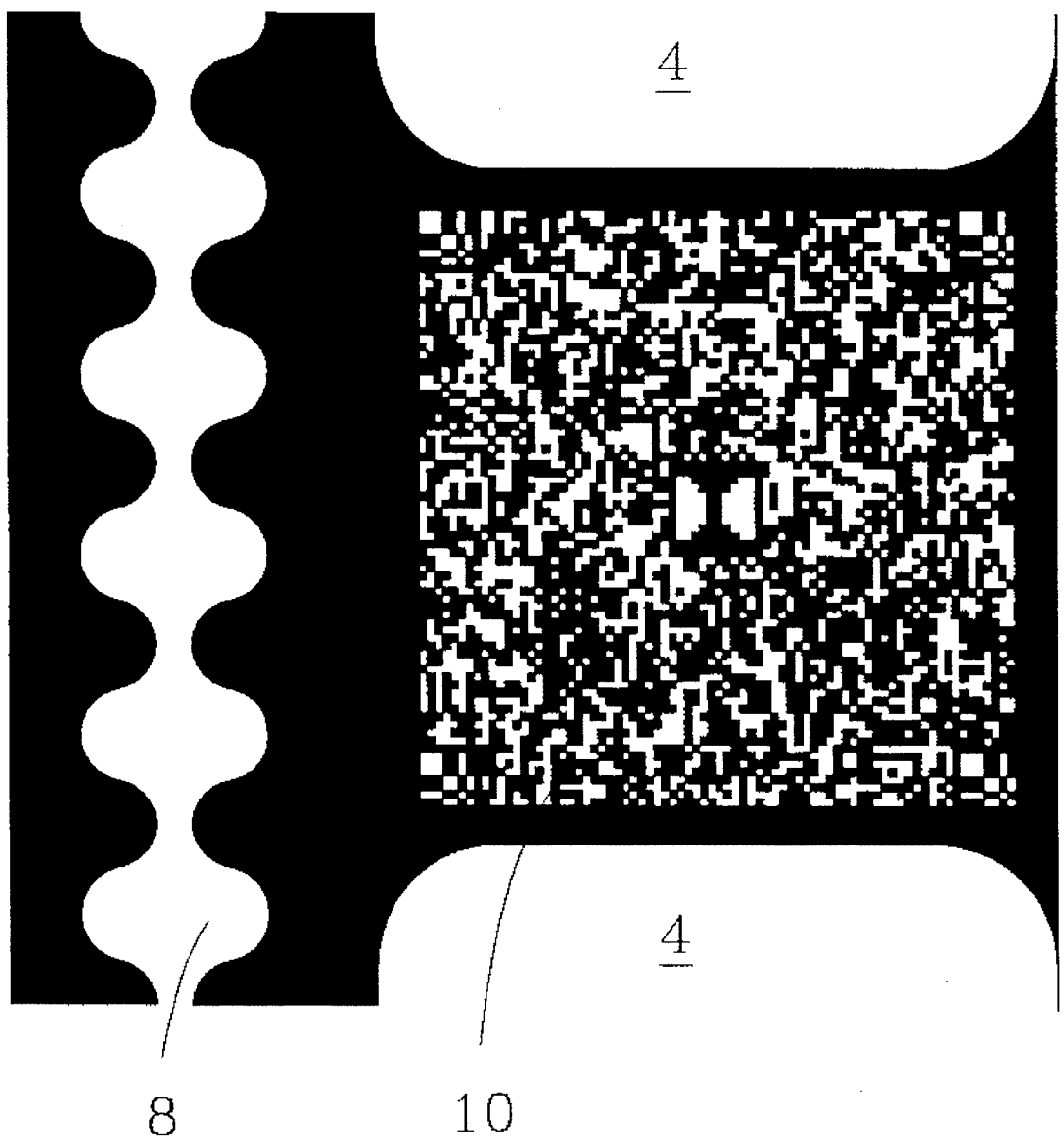
FIG. 4 is a further expanded view of a portion of FIG. 3, showing an exemplary block of symbols representing digital information according to the present invention.

FIG. 4 shows in even greater detail a portion of the film 2 including a block of symbols 10 between two sprocket hole perforations 4. One of the analog tracks 8 is also shown.

A. Location and Configuration of Data Fields

The blocks of symbols comprise a 76-by-76 array of contiguous square optically-transmissive and opaque symbols located relative to one another in such a manner that the symbol centers define the intersections of an orthogonal grid having equally spaced lines. Transmissive symbols may represent a binary one or zero and opaque symbols represent the opposite binary value. In the preferred embodiment, opaque symbols represent zeros. Throughout this document a symbol representing digital information will also be referred to as a "fixel," a shortened form of the term "film picture element."

In principle, the fixels need not be square but could be oblong, hexagonal, triangular, circular, or some other shape; the symbols need not be contiguous; and the grid defined by the symbol centers need not be an orthogonal grid with equally spaced lines. However, this preferred configuration is a good compromise offering a fairly high symbol packing density and a structure requiring only relatively low amounts of processing to recover the information represented by the symbols.

Figure 5:
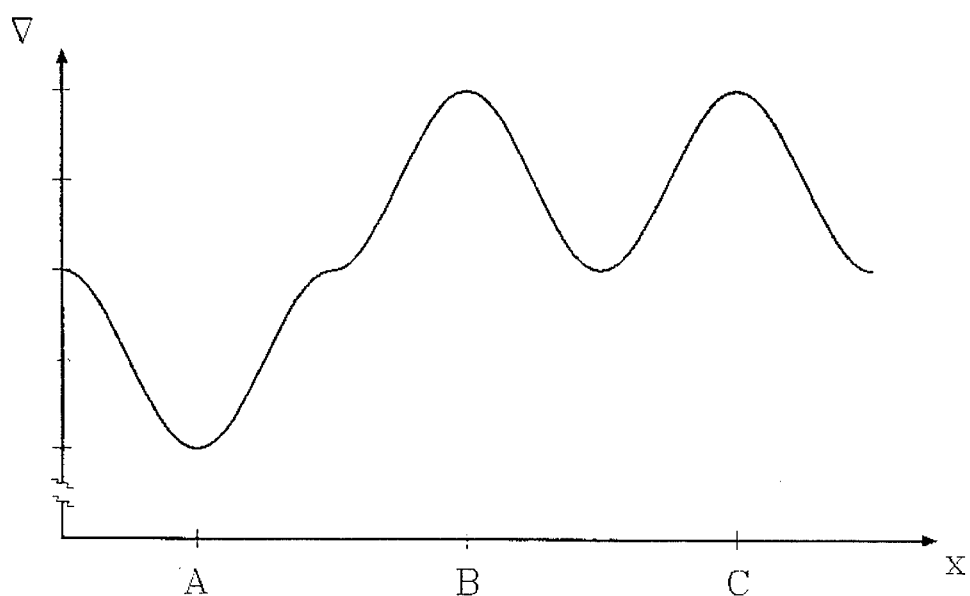
FIG. 5 is a hypothetical graphical representation of non-uniform optical transmissivity characteristics of two abutting symbols carrying digital information on an optical storage medium.

Preferably, the optical transmissivity of each symbol is uniform across its entire area. It is also possible to represent binary information with a symbol having nonuniform optical characteristics. FIG. 5 is a hypothetical graphical illustration of the optical transmissivity of three abutting symbols along a line passing through their centers; the curve for each symbol is sinusoidal. The significance of this nonuniform transmissivity will be better appreciated by one skilled in the art after understanding the use of equalization filtering, discussed below.

The size of each symbol is inversely related to the number of symbols which may be carried in a given area. In the absence of all other changes, digital data rates may be increased by reducing the symbol size, but reducing the symbol size may impair the ability to accurately determine the digital information represented by the symbols. For example, smaller symbols are more susceptible to film printing errors, corruption by the wear and tear of film usage, and focus problems in the optical sensing arrangement. Furthermore, for optical sensing arrangements based upon transmitted light levels, the smallest usable symbol size is constrained by diffraction effects at the edges of the symbols.

For 35 mm motion picture film, the preferred length of each square fixel side is about 32 microns; therefore the size of a 76-by-76 array of fixels (a block of symbols) is about 96 mils (2438.4 microns). Each block of fixels in an interperf area is located equidistantly from the two closest sprocket hole perforations and is horizontally centered and aligned with respect to them.

The standard horizontal width of a 35 mm motion picture film sprocket hole is 110 mils; thus, the width of the interperf area transverse to the film length if 110 mils. Two 7-mil (177.8 micron) wide opaque guard bands occupy the areas between each 96-mil wide block of fixels and the left and right boundaries of the interperf area.

The standard vertical distance between 35 mm motion picture film sprocket holes is 109 mils; thus, the height of the interperf area along the film length of 109 mils. Two 6.5-mil (165.1 micron) wide opaque guard bands occupy the areas between each 96-mil high block of fixels and the two adjacent sprocket hole perforations.

The location of the block of symbols is not critical to the invention, it its' placement in the interperf area does provide compatibility with motion picture systems which utilize only the older analog soundtracks. As a result, a single inventory film with both analog and digital soundtracks is possible.

For 70 mm film, the general arrangement is similar because the sprocket hole perforations and distances between perforations are the same. However, instead of analog soundtracks, 70 mm film employs magnetic stripes carrying analog soundtrack information and those magnetic stripes are located in a different place than are the 35 mm film's analog tracks.

A complete array of fixels in an interperf is sometimes referred to in this document as a block of symbols or a "field."

B. Alignment Reference

In the preferred embodiment, the fixels in each block are applied to the optical-storage medium in such a manner that the centers of the fixels define the intersections of a grid of orthogonal equally spaced lines; thus, fixels have known precise physical locations relative to one another. It is therefore possible to establish one or more references which may assist in locating the precise center of each symbol; the references may be either extrinsic to the field, or they may comprise one or more symbols within the field. These references are refereed to herein as "alignment patterns." Although alignment patterns are not necessary to practice the current invention, they can greatly reduce the amount of processing required to located the symbols.

An alignment pattern may be located at each of the four corners of each block of fixels. Less than four alignment patterns may be workable, depending on the particular application, the data density carried by the medium, and the processing power of the symbol recovery apparatus. Alternatively, the opaque guard bands adjacent to the edges of the block of fixels may be used as an aid in locating the symbols and determining their digital values.

As mentioned above, the central portion of each field or block of fixels may be reserved for other data carrying purposes, for a further alignment pattern, or may not carry any useful information. In the preferred embodiment, a 12-by-12 symbol array area represents no soundtrack or auxiliary information and is reserved for future uses. In the embodiment shown in the drawings, the central 12-by-12 fixel area of the digital information block depicts a registered trademark of Dolby Laboratories Licensing Corporation, the "Double D" symbol. This is most clearly seen in FIG. 4.

If used, each of the one or more alignment patterns should comprise an array of fixels having good autocorrelation characteristics. A 7-by-7 array is employed in the preferred embodiment. The autocorrelation characteristics of the alignment pattern are such that a low autocorrelation value results when the pattern is not congruent with itself. A cross-multiplied 7-bit Barker code ($1110010_2$) satisfies the desired autocorrelation characteristics. Preferably, if more than one alignment pattern is used, all of the alignment patterns contain the same array of fixels and are located in each corner of the block of fixels. In the preferred embodiment, a band of opaque fixels is placed along the two inside edges of the alignment pattern, the alignment pattern and the band of opaque fixels thus forming a 8-by-8 array of fixels.

C. Configuration of Bytes

The preferred embodiment groups the binary data represented by the fixels in each field into 8-bit bytes to facilitate use of error detection/correction (EDC) codes. In order to assist the correction of errors, the dimensions of each byte is chosen to minimize the number of bytes affected by film surface defects such as scratches and dirt; thus,the fixels constituting a byte are arranged into as square an area as possible. This dictates an area comprising an array of either 2-by-4 fixels, or 4-by-2 fixels. Each of the 8-bit bytes of binary digital information preferably are represented by fixels arranged on the film in a 2-by-4 array of fixels; two horizontal fixels transverse to the film length by four vertical fixels along the film length. Thus, each field or block of fixels has symbols representing 38 bytes of digital information across the width of the field and 19 bytes of digital information down the length of the field.

A 2-by-4 array is preferred over a 4-by-2 array for motion picture film because scratches are more likely to be vertical along the direction of film motion. A fewer number of bytes having a dimension of 2-by-4 fixels are more likely to contain all of a scratch than bytes having any other dimension.

For other applications, it may be preferable to group symbols into two-dimensional areas having dimensions different from that preferred for motion picture film applications. The shape of the two-dimensional areas should be chosen to minimize the number of areas affected by error-causing phenomena.

The digital information, after encoding, may be randomized prior to its application as symbols on the film so that the blocks of symbols will not be likely to contain large transmissive or opaque areas. The occurrence of a large area of opaque or transmissive symbols would therefore most likely indicate a large surface defect.

II. APPARATUS

Figure 6:
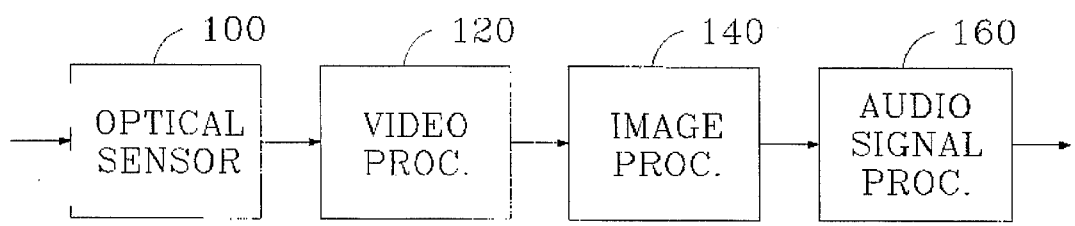
FIG. 6 is a functional block diagram of a motion picture film soundtrack playback system incorporating the preferred embodiment of the present invention.

FIG. 6 is a high-level functional block diagram of a motion picture film soundtrack playback system incorporating the preferred embodiment of the present invention. The Optical Sensor 100 optically scans two-dimensionally encoded information carried by an optical-storage medium and generates video signals in response thereto. The Video Processor 120 controls the scanning rate of the Optical Sensor 100 and generates digital signals forming a two-dimensional image representation in response to the video signals. The Image Processor 140 filters the two-dimensional image representation to improve it resolution and generates digital information corresponding to the value of the optically encoded information carried by the optical-storage medium. The Audio Signal Processor 160 decodes the digital information into electrical signals for an audio presentation.

A. Optical Sensor

Figure 7:
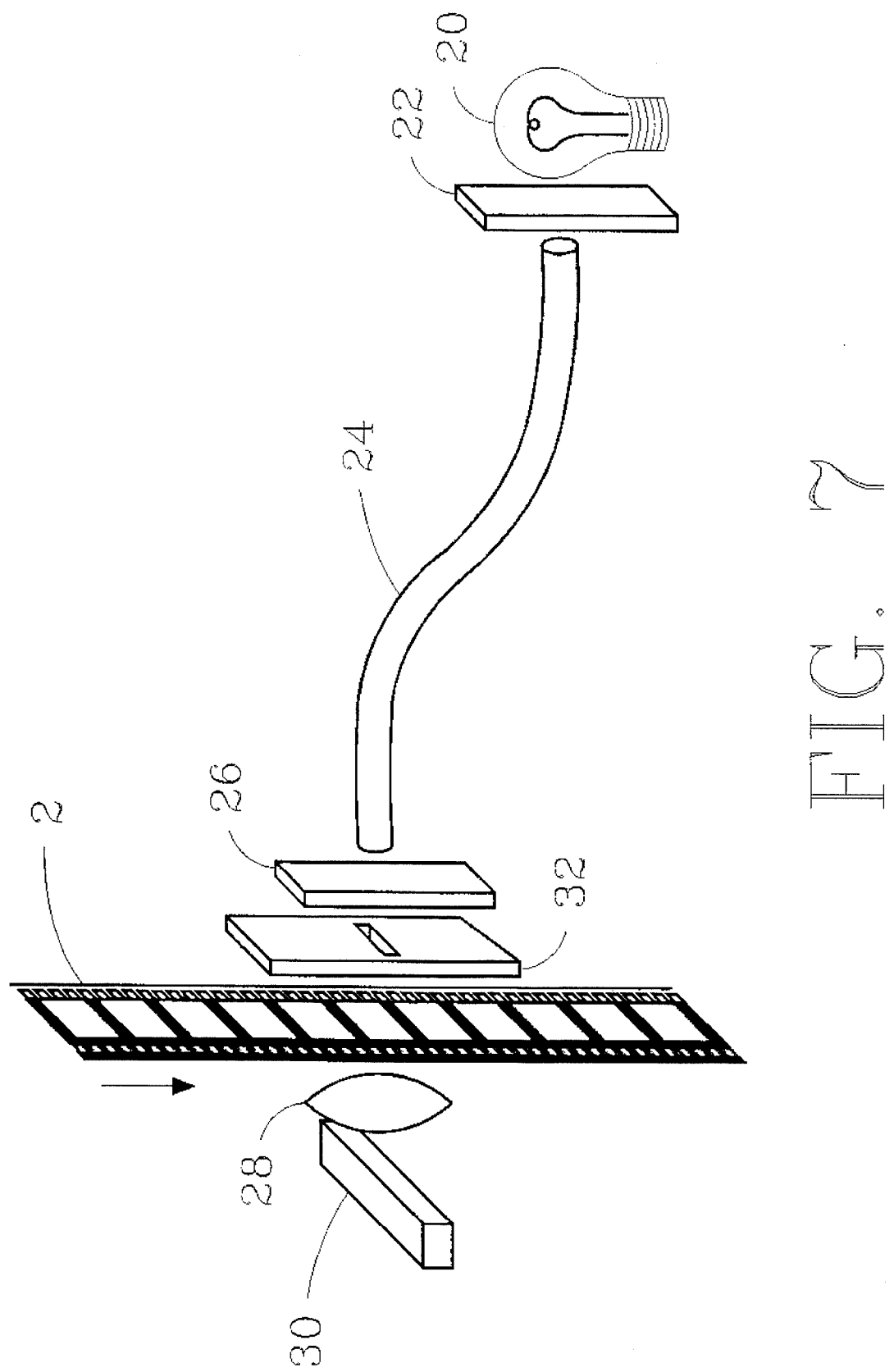
FIG. 7 is a schematic view of the preferred embodiment of an Optical Sensor for use with an optical storage medium in the form of motion picture film stock.

FIG. 7 is a schematic representation of the preferred embodiment of Optical Sensor 100 which includes a portion of the apparatus for oversampling the symbols carried by the optical-storage medium. The optical properties of the blocks of transmissive and opaque fixels are read transmissively. Preferably, a diffuse light is used to illuminate the medium; a diffuse light provides a lower contrast ratio which tends to render scratches invisible.

A remotely located wide spectrum white light source 20, which may be a 75-watt halogen incandescent lamp, for example, provides illumination to one side of the film 2 via infrared (IR) blocking filter 22, a light pipe 24, and a diffuser 26. The light pipe 24 may be a fiber optic cable. If the fiber optic cable is noncoherent, the cable itself provides a diffusion function and a separate diffuser may not be necessary. The IR blocking filter 22 is located at the lamp end of the fiber optic cable and the diffuser 26 is located at the film end of the cable. Diffuse light thus illuminates one side of the film 2 in the region of the film sprocket hole perforations, between which the blocks of symbols representing digital information are carried. A lens system 28 is located immediately on the opposite side of the film to optically focus the image on an optical sensing means such as a 512 picture element ("pixel") linear charge-coupled-device (CCD) array 30.

A 512 pixel linear CCD array is preferred because a 256 pixel CCD array does not allow a sufficiently high sampling rate, whereas a 1024 pixel CCD array results in a too high data rate for other components in the system. In theory, a 1024 or even larger seize CCD array is desirable provided that practical components are available to handle the higher data rates. Another factor is that the scanning rate for a 512 element device is such that a CCD and an analog-to-digital converter (ADC) designated for normal video applications can be employed, thus avoiding the necessity to use a very high cost CCD array and ADC.

One suitable CCD array is the model CL-C3-0512 optical scanner manufactured by Dalsa Inc. of Waterloo, Ontario, Canada. A similar device, the Dalsa Inc. model IL-C2-0512 is described in "Ultra High Speed CCD Image Sensors for Scanning Applications" by Brian C. Doody et al, *Proceedings of the SPIE—The International Society for Optical Engineering*, vol. 1107, pp. 105–116. The models differ mainly in the height of the photodiodes, the height being essentially the same as the width in the preferred CL-C3-0512 model.

Some sensors such as the above identified Dalso Inc. CL-C3-0512 device require a horizontal slit 32 to shield the CCD array from stray light. In one embodiment, a slit having a height of about 50 mils is located between the film 2 and either the diffuser or the end of the fiber optic cable if no diffuser is used. The slit height is not critical.

Although a linear CCD array is preferred because of its relatively low cost, small size and ruggedness, in principle other types of optical scanners can be used subject to requirements for scanning rate and resolution. For example, the optical sensing means can be a two-dimensional CCD array or an image orthicon tube. If a two-dimensional sensing arrangement is used, the motion picture film should be held relatively stationary in the sensing region, by a second Geneva pull down mechanism, for example, otherwise very high scanning rates must be employed. Alternatively, a flying spot scanning system can be employed. The invention contemplates any means for oversampling from which a two-dimensional image representation of each field may be derived.

Referring to FIG. 7, the film 2 is continuously transported by conventional means through the light transmission and sensing region in the direction shown by the arrow. Linear CCD array 30 is mounted horizontally, optically sampling along a line transverse to the direction of film travel. For simplicity, the schematic drawing does not show the means for transporting the film, nor does is show the means for mounting the various components of the apparatus.

1. Optical Oversampling

A significant aspect of the present invention is oversampling the storage medium in two dimensions. For the preferred embodiment in motion picture film applications, the film is optically oversampled in the horizontal direction by imaging each symbol or fixel onto more than one CCD element or pixel, and the film is optically oversampled in the vertical direction by scanning the film or reading the CCD array at a rate more than once per fixel as the film moves vertically relative to the CCD array. The horizontal optical sampling rate is a function of fixel size, optical magnification, and CCD array pixel size. The vertical optical sampling rate is a function of fixel size, vertical film speed, and CCD line scanning rate.

Turning first to horizontal optical oversampling, each square fixel in the preferred embodiment is approximately 32 microns along each side. Each pixel of the preferred Dalso linear CCD array has a 13 micron width and height, but the pixels centers are 14 microns apart. In the preferred embodiment an f4 lens system images the pixel width down to about 5.6 microns at the plane of the film. Thus, about five or six CCD array pixels read each 32 micron film fixel, providing a horizontal optical sampling rate of approximately 5.7 optical samples per fixel. By changing the lens system appropriately, CCD array with other pixel widths can be made to provide a similar number of pixels to read each fixel.

In the present invention, there is not requirement for any fixed relationship between particular fixels and CCD array pixels. In the present embodiment, for example, as the motion picture film is transported past the lens system, a particular horizontal fixel position in the block of symbols need not be read by the same CCD array pixels. In actual practice, a particular fixel location will not be read by the same CCD array pixels due to horizontal weave of the film.

Large amounts of film weave are tolerated by overscanning at the ends of the CCD array to allow the film to shift horizontally and still be within the sensing range or field of view of the optical sensing means. In the preferred embodiment, the image of each 76 fixel wide symbol block optically projects onto only 431 of the 512 CCD array pixels. The installation of the optical sensor should position the linear CCD array so that the fixel blocks image on the average is projected onto the center 431 pixels. If the optical sensor is mounted at the same location in the projector as the analog track readout, a single 1024 pixel linear CCD array may be used to scan both the digital information fields and the analog tracks.

"Overscanning," which is the scanning of the film beyond the borders of the blocks of symbols, should not be confused with "oversampling," which is the taking of samples at a rate greater than the Nyquist sampling rate.

Although there may be slight skewing of the lines of fixels on the film relative to the CCD array as a result of film motion, such skewing need not be compensated by skewing the CCD array position. This is because the digital information is recovered from the film be deriving a two-dimensional image representation, as described further below. In a practical embodiment of the present invention, there is tolerance of substantial azimuth errors up to about 15 degrees. In principle, very substantial azimuth alignment errors may be tolerated if the recovery system has sufficient processing power.

Turning now to vertical optical oversampling, the vertical film speed in the United States is 24 frame per second or approximately 450 mm per second. In the preferred embodiment, the fixels are 32 microns along each edge; hence, the digital information on the film moves in the vertical direction at rate of approximately 14,300 fixels per second. At this speed, a nominal CCD line scanning rate of approximately 40 kHz provides a vertical optical sampling rate of approximately 2.8 optical samples per fixel and optical aliasing is acceptably low. The vertical optical sampling rate and optical aliasing are functions of the interplay between the optical filtering effect resulting from the relative pixel to fixel apertures and the CCD line scanning rate.

In the preferred embodiment, the choice of fixel size, optical magnification, and CCD array pixel size results in a horizontal optical sampling rate of approximately 5.7 optical samples per fixel. The choice of fixel size, vertical film speed, and nominal CCD line scanning rate results in a vertical optical sampling rate of approximately 2.8 optical samples per fixel. The vertical optical sampling rate need not be as high as the horizontal optical sampling rate because film motion in the vertical direction tends to "smear" or elongate the fixels, thereby reducing their harmonic information content.

The film 2 is continuously transported through the sensing region at or close to the normal projection rate of 24 frames per second. Continuous movement of the film cooperates with the scanning of the CCD array to provide one of the two directions of scanning required by the system. Although the nominal CCD line scanning rate is approximately 40 kHz, the exact scanning rate is varied to closely track short term and long term variations in vertical film speed. Thus, the present invention is tolerant of substantially all short term and long term variations in speed that are likely to be encountered in motion picture projectors that are currently in use, including older projectors. This aspect of the invention is described below in more detail.

2. Location of Optical Sensor

In principle, a motion picture film soundtrack playback system incorporating an alternative embodiment of the present invention can be adapted to scan or read the blocks of fixels in the picture projection area of the projector, or a second Geneva-type pull-down mechanism could be provided so that each field or block of fixels is held essentially motionless briefly when read. In this case, a two-dimensional sensor is required. If the invention is used in other environments in which the storage medium is not moving, a two-dimensional CCD array or other two-dimensional sensing device would be preferred in order to avoid any requirement to move the medium with respect to the sensing device.

An analog soundtrack must be read at a conventional location in the motion picture projector; the analog soundtrack is about 24 frames in advance of the picture in a 35 mm system. The choice of the sensor location for digital soundtrack information is more flexible, however, because a compensating time delay may be easily implemented in the digital domain. Thus, by recording the symbols representing digital soundtrack information on the film four or more frames in advance of the analog tracks, i.e., 28 frames in advance of the picture, it is possible to physically locate the digital soundtrack sensor anywhere from the conventional analog readout location upward in the projector. In order to reduce cost and simplify the system, the digital information sensor is preferably at or near the location in the motion picture projector where the analog tracks are read. In view of the time delay in processing and decoding the digital information relative to the analog information, which is essentially instantaneous, it is necessary for the digital information to be slightly time advanced with respect to the analog soundtracks if they are to be read at the same location in the projector. Preferably, the relative timing relationship of the digital information is optimized such that 1) a reproduction system may "switchover" from the digital to the analog soundtrack in the event of excessive errors or corruption of the digital soundtrack playback, and 2) the film may be spliced without adversely affecting the digital soundtrack.

If the reading locations for the digital and analog soundtracks are located at the same place, a single linear array may be employed which scans across both the digital and analog soundtrack regions on the film and directs the information to respective digital and analog processing circuitry. Alternatively, separate readout or sensing devices may be employed if the digital and analog readouts are done at different locations or even if they are done at substantially the same location. It is also possible to locate the digital sensor in the so-called "penthouse" area above the projector in the region where the magnetic soundtracks of 70 mm films are read. When the system is used with 70 mm motion picture, the digital readout is preferably located in the vicinity of the analog magnetic playback heads in the 70 mm magnetic readout projector penthouse.

If the digital information reading area is located at or near the location where the analog tracks are read, no additional film handling mechanisms are required. If the digital information reading area for a 35 mm film projector is located in a penthouse, however, an additional film transport is required so that the film is substantially stable at the readout location in a plane perpendicular to the direction of light transmission through the film. Such transport arrangements are well known in the art and one suitable transport system is a version of the Davis tight-loop film transport system described in the *Audio Cyclopedia*, 2d ed., by Howard Tremaine, Howard W. Sams & Co., Indianapolis 1969. See particularly FIGS. 18–28A at page 913 thereof and the related textual material. A smaller flywheel is likely to be required than is required for reading a conventional analog soundtrack. Although it is preferred that the film is substantially in a plane while in the readout area, systems embodying the invention may be relatively tolerant of deviations of the film by providing a relatively broad depth of field of the CCD imaging optics. Other distortions resulting from a non-planar film readout may be inherently accommodated by the manner in which the invention recovers the symbols and determines the digital values they represent.

B. Video Processor

Figure 8:
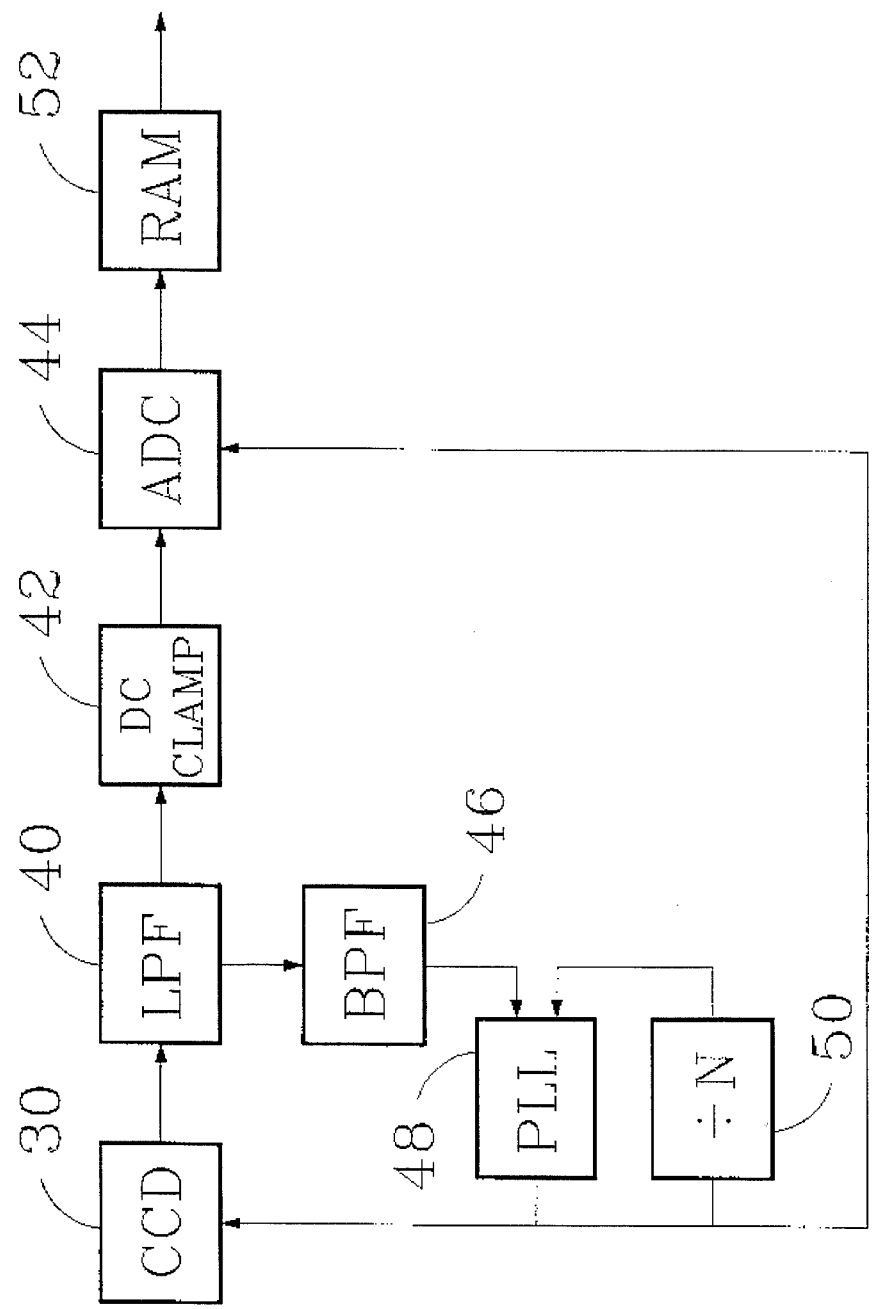
FIG. 8 is a functional block diagram of the Video Processor portion of a motion picture film soundtrack playback system which includes the present invention.

FIG. 8 is a functional block digram showing the interconnections of CCD array 30 with the preferred embodiment of Video Processor 120. The output of the CCD array 30, and hence the output of the Optical Sensor 100, is a wide bandwidth video-like pulse amplitude modulated analog signal. That signal is passed through the anti-aliasing low-pass filter 40, and the black level of the signal is clamped to DC in the DC clamp 42 after every scan in the same manner as that done by a television receiver for a television signal. The CCD array must be over-clocked in order to provide a black-level signal at the end of each scan. The clamped video signal is passed to an 8-bit ADC 44 which electrically samples the optical samples provided by the CCD array 30. The 8-bit samples generated by the ADC 44 are stored in the random-access memory (RAM) 52. The scanned CCD array 30 taken with the film movement and the electrical sampling by the ADC 44 provide in the RAM 52 an oversampled digital signal of an image representation in two dimensions of the symbols carried by the optical-storage medium.

The electrical sampling or resampling of the optical samples by the ADC 44 is a practical requirement to transform the optical samples into a form suitable for subsequent processing in the digital domain. The electrical resamples from the ADC 44 express the analog optical sampling information as 256 discrete levels in 8-bit bytes suitable for digital processing. As mentioned above, in principle, derivation of the two-dimensional image representation and recovery of the digital values of the symbols may be done wholly or partly in the analog domain, although probably at the cost of greater complexity and expense. Analog processing may not require any electrical resampling of the optical samples provided that the optical samples are represented electrically as, for example, by the output of a CCD array.

As mentioned briefly above, the line scanning rate of the CCD array 30 is varied according to variations in the vertical speed of the film 2 so that optical scanning is tolerant of short term and long term variations in film speed. A measure of vertical film speed is available from the video-like signal generated by the CCD array 30. The dominant low-frequency component of this signal is a nominal 96 Hz signal generated in response to the light passed by alternating sprocket perforations, which are completely transmissive, and interperf areas, which are not as transmissive. This dominant low-frequency component is a direct measure of the current vertical speed of the film 2.

A variable of programmable clock arrangement for causing the CCD array 30 scan rate and the ADC 44 clock rate to track the motion picture film speed in provided by a bandpass filter 46, a phase-locked loop (PLL) comparator 48, and a frequency divider 50. The bandpass filter 46 has a bandwidth of about 100 Hz centered at the nominal 96 Hz interperf rate for 35 mm film. This bandwidth and center frequency of the filter are scaled by 5/4 for 70 mm film. The PLL comparator 48 receives a nominal 96 Hz signal from the filter 46 along with a 96 Hz reference signal derived from dividing the frequency of its nominal 11 Hz output by the frequency divider 50. The nominal 11 MHz output of the PLL 48 is applied as the clocking signal to the CCD array 30 and to the ADC 44. The CCD array and ADC scan rates thus closely follow variations in the motion picture projector film speed.

Although a nominal 11 MHz clock is applied to the particular Dalsa Inc. CCD array used in the preferred embodiment, the effective pixel clock rate is actually a nominal 22 MHz. This is because this particular 512 element CCD array is configured as two interleaved 256 element devices and the samples are produced simultaneously in two separate outputs. One output channel must be delayed by one half a sample time. Thus, whether a single 512 element CCD array is clocked at 22 MHz or two interleaved 256 element devices are clocked at 11 Mhz, the CCD line scanning rate is approximately 40 kHz. This is a detail of the particular CCD array, however, and is not a feature or requirement of the invention. In the preferred embodiment using the particular Dalsa Inc. CCD array, each of the two interleaved devices is clocked for 272 pixels to provide a black-level signal for the DC clamp 42.

By clocking the CCD array 30 and the ADC 44 from the same programmable clock, the respective sampling functions run synchronously with each other which tends to suppress the generation of undesirable artifacts that may otherwise result from non-synchronous operation.

The ADC 44 converts or resamples 512 optical samples per scan line received from the CCD array 30 into 256 electrical samples per line scan, thereby reducing by one-half the oversampling in the horizontal direction. Oversampling in the vertical direction is not reduced by the ADC 44. Thus, the effective oversampling rate in both the horizontal and vertical directions is approximately 2.8 samples per fixel.

Electrical resampling should not degrade the two-dimensional optical oversampling rates to the extent that the digital values represented by the symbols cannot be determined to a desired accuracy. Ideally, the ADC 44 would be operated at a higher rate; however, its output may need to be limited in view of practical hardware limitations downstream in the system. For example, the digital signal processing chips used in one practical implementation of the invention are limited in the amount of RAM that they can address. If the ADC 44 is operated at too a high rate, the number of samples generated for each block of fixels will exceed this limited amount of RAM.

Low oversampling rates result in two related, although distinct, problems: 1) the recovered image representation may have inadequate resolution in view of the number of samples taken, and 2) the cut-off frequency of the anti-aliasing low-pass filter required by the low sampling rate may be so low that intersymbol interference degrades the recovered image representation.

By operating the ADC 44 at a sampling rate of 256 samples per scan line, the anti-aliasing low-pass filter cut-off frequency is not so low that intersymbol interference is excessive. Intersymbol interference manifests itself as a "smearing" or ringing of the transitions between fixels of opposite sense. To say that the intersymbol or smearing is not excessive means that reconstruction of the image representation to a desired resolution, e.g., resolution enhancement, is possible using only relatively short reconstruction filters.

C. Image Processor

Figure 9:
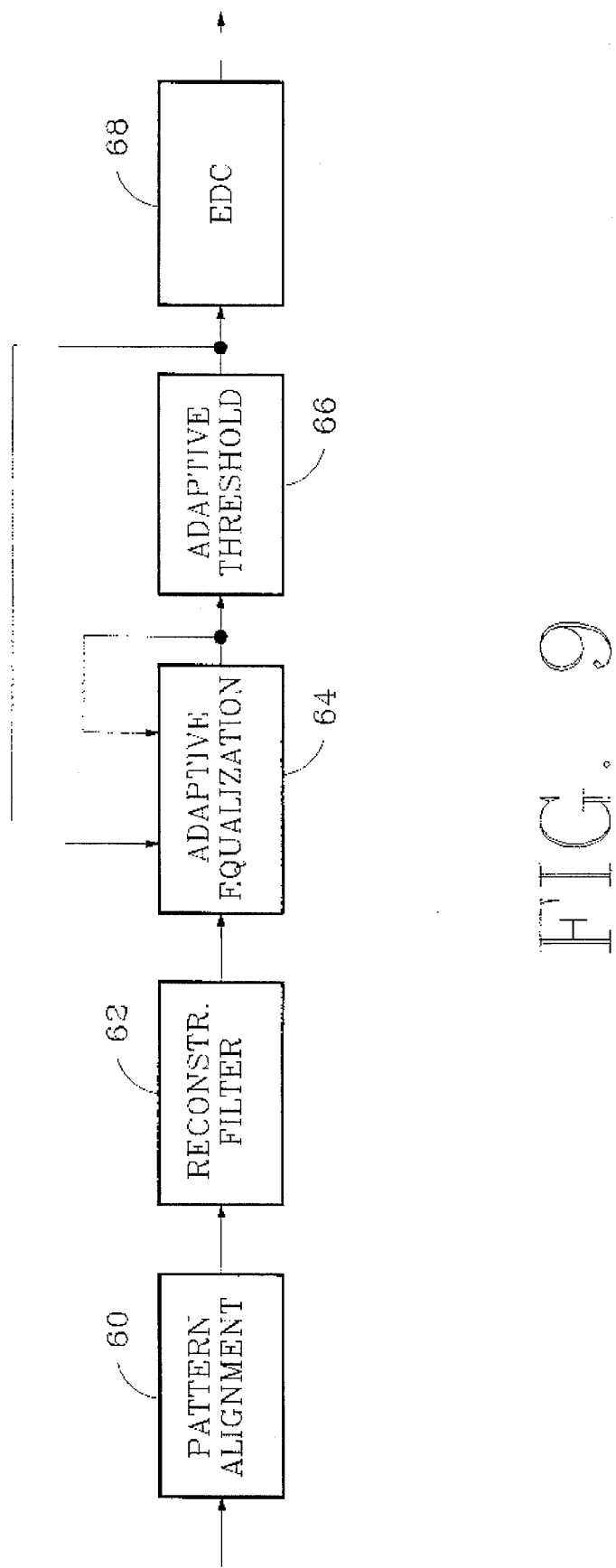
FIG. 9 is a functional block diagram of the Image Processor portion of a motion picture film soundtrack playback system which includes the present invention.

FIG. 9 is a functional block diagram showing the preferred embodiment of the Image Processor 140 which improves the resolution of the image representation stored in the RAM 52 and generates digital information corresponding to the value of the optically encoded information carried by the optical-storage medium. The pattern alignment 60 determines the location of one or more alignment patterns within the image representation and thereby reduces processing requirements by restricting the area within the image representation which must be "upsampled" by the reconstruction filter 62. The adaptive equalization 64 further filters the image representation, reducing the effects of intersymbol interference. The adaptive threshold 66 generates binary data corresponding to the digital information within the image representation; for the preferred embodiment of the optical-storage medium described above, a one is generated in response to each transmissive symbol and a zero is generated in response to each opaque symbol. The error detection/correction (EDC) 68 rectifies correctable errors detected in the binary data.

For applications incorporating the preferred embodiment of motion picture film described above, the output of the ADC 44 occurs in an uneven flow of blocks or bursts of digital data because of the arrangement of the fields in the interperf area of the motion picture film. The duty cycle of the bursts is approximately 50% because each field or block of fixels is separated from the next field by a sprocket perforation hole whose vertical dimension is roughly the same as the vertical height of the fields.

This digital data output from the ADC 44 represents analog samples of the symbols resulting from oversampling the symbols in two dimensions. The timing of the functions performed by the Image Processor 140 follow the timing of the Optical Sensor 100. Special system timing considerations resulting from the uneven flow of the digital data is discussed in more detailed below.

In the preferred embodiment, the reconstruction filter 62 applies two-dimensional filters to the image representation generated by the Video Processor 120 to improve the resolution of the two-dimensional image representation of the symbols carried by the optical storage medium. The two-dimensional filtering, sometimes referred to herein as "upsampling," is in the nature of reconstruction filtering or image enhancement.

Also in the preferred embodiment, the adaptive equalization 64 reduces intersymbol interference by filtering the upsampled image with adaptive sparse two-dimensional filters, and the adaptive threshold 66 generates in response to the equalized image a binary representation of the fixels. The output of the adaptive equalization 64 and the adaptive threshold 66 is used to adapt the equalization filter coefficients. The adaptive threshold 66 adapts its threshold level in response to statistical characteristics of the output of the adaptive equalization 64. Both adaptive equalization and adaptive thresholding are described below in more detail.

The processing requirements to perform reconstruction filtering for increasing resolution and to perform equalization filtering for reducing intersymbol interference are inversely related to the amount of oversampling of the symbols. Oversampling at a sufficiently high rate reduces and may eliminate resolution and intersymbol interference problems. In practical systems, depending on the cost and availability of electro-optical and electronic devices, the system designer may be required to balance the amount of oversampling against the processing power required for symbol recovery and image enhancement.

Even if the Optical Sensor 100 and the Video Processor 120 are operated at a higher sampling rate than described herein, it may still be advantageous to perform some two-dimensional filtering to smooth and enhance the two-dimensional image representation. Although two-dimensional filtering is most economically performed in the digital domain, the filtering may be performed in the analog domain. If performed in the digital domain, the two-dimensional filtering may be accomplished in the preferred embodiment of the present invention by applying two cross-multiplied one-dimensional filters.

More complex two-dimensional filters may be required for alternative embodiments using a storage medium carrying symbols whose centers define nonorthogonal patterns. Such filters may be required, for example, to recover digital information from an array of symbols arrayed in a honeycomb pattern.

In a practical embodiment, in order to provide sufficient cost-effective processing power with currently available digital signal processing (DSP) chips, several sets of RAM and DSP chips make up the memory and processing means. Based on currently available digital signal processing hardware, the preferred DSP chips are the Motorola model 56001 digital signal processor employed in a pipeline architecture. Each has a read-only memory (ROM), RAM for each of the processor chip's three address spaces, and an interface to external input/output. Each of the multiple DSP/ROM/RAM combinations can be generically configured for the system, allowing the economy of manufacturing one type of board while allowing the hardware to perform different functions by changing only the software in ROM. Despite practical considerations which require a separate set of RAM chips for each DSP chip, the RAM 56 discussed herein and depicted in the drawings refers to these RAM chips collectively.

1. Pattern Alignment

In the preferred embodiment of the present invention, the centers of the fixels define the intersections of an orthogonal grid of equally spaced lines; thus, by determining the location of two or more fixels within a field. A set of positional references can be established which can greatly reduce the amount of processing required to determine the location of all other fixels within that field. Although alignment patterns are not required to practice the present invention, the preferred embodiment utilizes alignment patterns in each corner of each fixel block to reduce the amount of processing required to determine the positional references. By determining the precise location of each alignment pattern in the two-dimensional image representation, the expected location of each fixel center in the image representation can be established fairly precisely. Once the fixel centers in the image representation are determined, the light levels transmitted by the fixels at their centers are compared against references or thresholds to determine if a binary one or a binary zero is represented by each fixel in the image representation. In performing these functions, the Image Processor 140 acts on the two-dimensional image representation of the fields generated by the Video Processor 120 in response to the signal received from the Optical Sensor 100.

Thus, in the preferred embodiment, the Image Processor 140 generates a binary representation of the information carried by the fixels by determining the position of the fixels within the image representation, examining the value of light transmitted by each fixel to determine whether a fixel is transmissive or opaque, and generating a one or zero in response to a transmissive fixel or an opaque fixel, respectively.

More specifically, in the preferred embodiment represented in FIG. 9, the pattern alignment 60 determines the position of the fixel centers by first locating one or more alignment patterns relative to which fixel positions can be established. The pattern alignment 60 looks for the alignment patterns in the fixel block image representation. As mentioned above, the alignment patterns are based on the 7-bit Barker code. Barker codes are a class of bit patterns well known in the art which have good autocorrelation properties. The Barker codes have the same autocorrelation peak as any other bit pattern, a value equal to number of bits the code is wide, but their autocorrelation side lobes are only one unit high.

The 7-by-7 alignment pattern is a cross-multiplication of the 7-bit Barker code. The alignment pattern in the image representation, after two-dimensional oversampling, comprises a 20-by-20 array of 400 samples in the RAM 52. The expected values of the samples in an alignment pattern, referred to herein as a "known pattern," comprise a 20-by-20 array of 400 elements. A cross-correlation score between samples in the image representation and a known pattern is obtained by cross-multiplying 400 samples in the image representation by 400 elements in the know pattern. The cross-correlation peak is found by shifting the known pattern in one dimension by one sample relative to the image representation, cross-multiplying to determine a cross-correlation score, shifting, and cross-multiplying until a peak cross-correlation score is obtained. The position of the known pattern which yields a cross-correlation peak establishes with a precision of one sample the position of the alignment pattern within the image representation.

It is desirable, however, to determine the position of the alignment pattern with even greater precision. A four-fold increase in resolution is possible by defining a set of sixteen distinct known patterns, each of which represents the expected values of the samples in an alignment pattern shifted by increments of one-quarter of the interval between samples in either or both of two dimensions, and by determining which of the sixteen known patterns provides the largest cross-correlation peak with the image representation. Each of the sixteen known patterns represent one of four phase shifts in horizontal sampling and one of four phase shifts in vertical sampling. The set of sixteen quarter-phase known patterns comprise an 80-by-80 array of 6400 elements which can be pre-computed and stored in ROM, or computed and stored in RAM as needed.

If sufficient processing power is available in the digital domain, cross-correlation scores may be obtained between the entire image representation and the known correlation patterns to determine the alignment pattern locations. The amount of processing power required to locate alignment patterns may be reduced by either estimating the location of each pattern and beginning the search at the estimated location, or by confining the search to areas within the image representation in which the patterns are most likely to be found.

The pattern alignment 60 comprises an edge detector which estimates the position of each alignment pattern by finding the edges of each field within a precision of one fixel. The edge detector is essentially like an alternating-current detector, examining a line of samples within the image representation and determining the uniformity of the samples. If the samples are not uniform, the edge detector concludes that the line of samples lies within the field. If the samples are essentially uniform, the edge detector concludes that the line of samples lies within one of the opaque guard bands surrounding the field. See FIG. 4.

Figure 10:
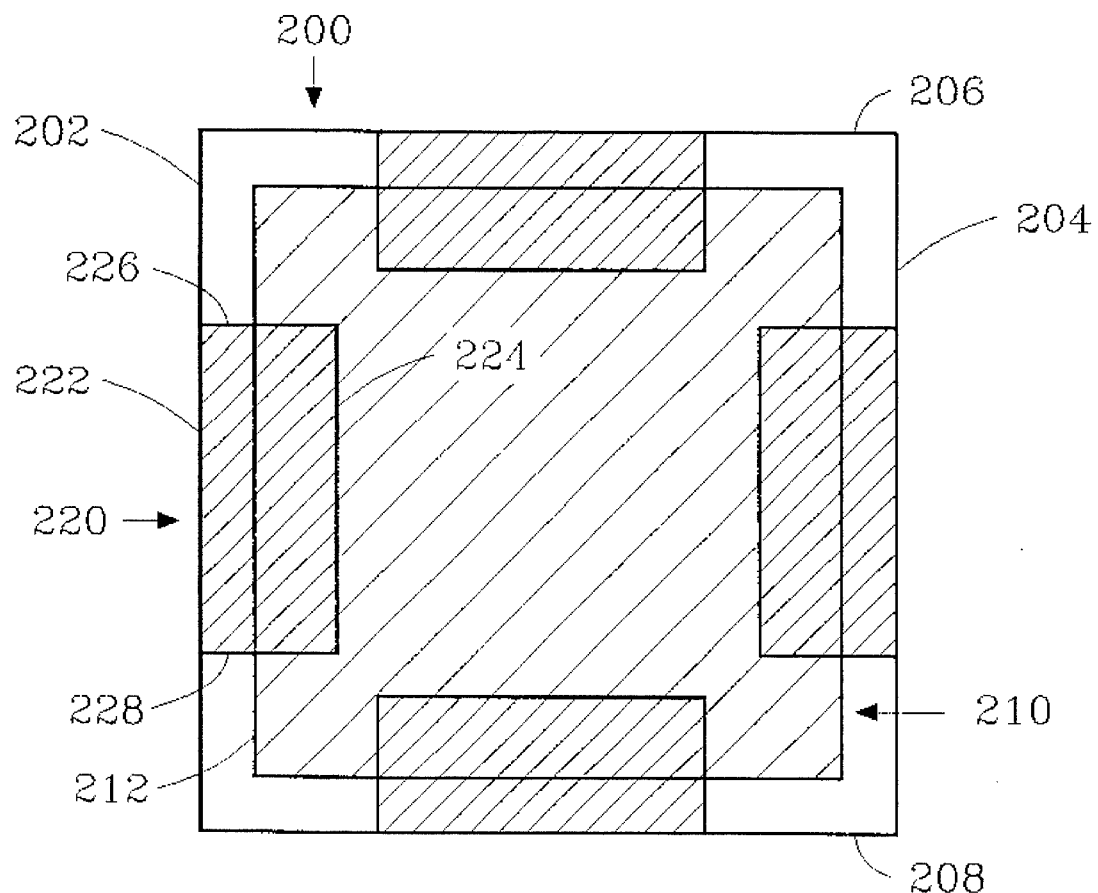
FIG. 10 is a schematic diagram illustrating field edge search zones associated with a two-dimensional image representation of a field.

In the preferred embodiment, the edge detector confines its search to a rectangular region within the image representation referred to herein as a "search zone." A distinct search zone of 50-by-120 samples is defined for each of the four field edges such that the zone abuts the boundary of the image representation adjacent to its respective field edge. The "exterior border" of each search zone abuts a boundary of the image representation. The "interior border" of each search zone is on the opposite side of the zone from its exterior border. The longer dimension of each search zone is parallel to its exterior and interior borders, and parallel to its respective field edge. FIG. 10 illustrates the field edge search zones. Under ideal conditions, the field 210 is substantially centered in the image representation 200 which is stored in the RAM 52, and each field edge is approximately centered between the exterior and interior borders of its respective search zone. Under practical conditions, film weave and jitter cause the field to move around in the image representation; however, each search zone is large enough to insure that its respective field edge falls between its exterior and interior boundaries under nearly all conditions.

For example, referring to FIG. 10, the search zone 220 for the left-hand field edge 212 is a region whose left-hand border 222 abuts the left-hand boundary 202 of the image representation 200, and whose upper border 226 and lower border 228 are equidistant from the upper boundary 206 and the lower boundary 208 of the image representation 200. Under ideal conditions, the field edge 212 is approximately centered between the exterior and interior search zone borders 222 and 224, respectively.

In the preferred embodiment of the present invention, the edge detector of the pattern alignment 60 starts its search for each field edge at the interior border of the respective search zone. The edge detector measures the uniformity of a set of 39 samples apart lying along the interior border. If the samples are not uniform, then the edge detector examines another set of 39 samples lying along a line five samples closer to the exterior border and measures their uniformity. The edge detector reiterates these steps until the samples in a set are sufficiently uniform, thereby indicating the set of samples lie along a line that is within the opaque guard band adjacent to the field edge being sought. Having found a line of uniform samples in the guard band, the edge detector moves back toward the interior border and selects a point 2 samples away from the line of uniform samples; this point is the estimated location of the field edge. The edge detector repeats these steps for each edge.

The edge detector measures sample uniformity by summing the absolute value of the difference between adjacent samples within the line of 39 samples and comparing the sum to a threshold. For implementations in which the value for each sample is substantially in the range from −0.5 to +0.5, the threshold is 0.125, an experimentally determined value. If the sum exceeds the threshold, the samples are not uniform and the edge detector continues the search. If the sum does not exceed the threshold, the samples are sufficiently uniform for the edge detector to conclude they lie within one of the opaque guard bands.

If a field edge is not found before ten iterations are completed, the search for the edge is abandoned and the location of the corresponding edge which was most recently found in a previous field is used instead.

Having found the edges, the location of each alignment pattern can be estimated. The cross-correlation search for each alignment pattern begins at the estimated location, which is the intersection of the two edges adjacent to the respective pattern.

The next step performed by the pattern alignment 60 is to locate each alignment pattern within a precision of one example. This accomplished by finding the peak cross-correlation score between the image representation and a seventeenth known pattern derived from an average of four central known patterns from the set of sixteen quarter-phase known patterns discussed above. The central four patterns may be denoted as patterns KP(1,1), KP(1,2), KP(2,1), and KP(2,2), where {KP(ij)} represents the set of sixteen quarter-phase known patterns, where $0 \leq i < 4$ and $0 \leq j < 4$, and where i and j each representing in quarter-phase increments the amount of phase shift in one of two dimensions.

The cross correlation between the image representation and the seventeenth known pattern has a broader peak than the cross correlation between the image representation and any of the quarter-phase known patterns; therefore, the initial search in the image representation for each alignment pattern is assumed to begin on the skirts of this broader correlation peak. This assumption permits the pattern alignment 60 to direct is search based upon the gradient of two or more trial cross-correlation scores. The search is directed "uphill" along the correlation peak toward the peak score. This search is more efficient than an exhaustive search in a particular area of the image representation.

In practice, the maximum theoretically possible cross-correlation score may not be found because of a failure to accurately recover all of the alignment pattern symbols, or because of a deviation from expected samples values caused by any of several optical variations. In such cases, the peak cross-correlation score may still be useful even though it does not equal a theoretical maximum score, which in the preferred embodiment, is approximately 0.8 to 0.9. The preferred embodiment of the present invention, therefore, maintains an exponentially decaying average of the peak cross-correlation scores achieved for the fields and establishes a threshold at some fraction of the exponentially decaying average. Cross-correlation scores in excess of the threshold are assumed to indicate an alignment pattern has been found.

In the preferred embodiment, limited processing power dictates that the exponentially decaying average be recalculated for every second field, according to $$A_m = (X - A_{m-1}) \cdot E + A_{m-1} \qquad (1)$$

where $A_m$=average score of previous fields up to and including field m,

E=factor establishing the rate of decay, and

X=cross-correlation peak for field m.

The preferred embodiment uses a decay factor E of 0.01, providing a rate of decay of 1% across two field. The threshold is established at 67% of the exponentially decaying average, although a minimum level is also established below which the threshold may not fall. This minimum value, which in the preferred embodiment is equal to 0.2, helps assure that some arbitrary pattern will not be mistakenly identified as an alignment pattern during intervals when a failure to locate any pattern would other wise cause the exponentially decaying average to drop to a very low level.

If the peak correlation score exceeds the threshold, the pattern alignment 60 assumes that is has located an alignment pattern within a precision of one sample. It then refines the expected location to within a precision of one-quarter samples as described above by identifying which of the sixteen quarter-phase known patterns provides the largest peak cross-correlation score.

After the alignment patterns in each of the four corners of a field are located, a grid of positional references may be defined which coincide with the centers all fixels within the field. In the preferred embodiment, the grid nominally comprises the intersections of equally spaced orthogonal lines. In practical embodiments, aberrations in the storage medium such as scraping or stretching can distort the grid. By using four alignment patterns, one pattern in each of four corners of a field, and linearly interpolating the position of the grid lines between the alignment patterns, the preferred embodiment of the present invention can accommodate any linear distortion. Nonlinear forms such as pincushion or barrel distortion may be accommodated by using additional alignment patterns to segment the distorted field into regions whose distortion may be approximated as a linear distortion.

If the pattern alignment 60 cannot locate a particular alignment pattern, the location of the missing alignment pattern may be estimated relative to the position of other alignment patterns which are located within a given field. The location of a missing alignment pattern may also be estimated from the location determined for the corresponding alignment pattern in a prior field.

In the preferred embodiment, if the pattern alignment 60 fails to find a particular alignment pattern, it estimates the location of the sought-for alignment pattern by using the location of an adjacent pattern found in the current field and the distance between the sought-for pattern and the adjacent pattern in a previous field. The pattern which is adjacent in the horizontal dimension is used to make the estimate in preference to the pattern adjacent in the vertical dimension. Using the estimated location, the pattern alignment 60 attempts again to locate the pattern. If the second attempt also fails to locate the alignment pattern, the search is abandoned and the estimated location is used instead.

For example, if the alignment pattern in the upper-left corner of the field, referred to here as pattern UL, is not found but the upper-right pattern UR is found, then a search for pattern UL is conducted again using an estimated location derived from the location of pattern UR and the distance between the last found patterns UL and UR in a previous field. If pattern UL is found but pattern UR is not found, then the location of pattern UR is estimated relative to pattern UL.

If patterns UL and UR are not found but pattern LL is found, then the location of pattern UL is estimated relative to pattern LL. If patterns UL, UR, and LL are not found but pattern LR is found, the locations for all other patterns are estimated relative to pattern LR. If no patterns are found in the current field, the last found positions of patterns in a previous field are used.

The logic used for additional combinations of missing and found patterns will be apparent to one skilled in the art.

Although the alignment pattern search may be conducted entirely in the digital domain, some or all of the search may be performed by analog circuitry applied to the video signal generated by the CCD array 30 prior to the conversion into the digital domain by the ADC 44. For example, such circuitry could examine a sequence of 20 samples from the CCD array 30 and generate a signal when a sufficient number of samples, say 18, match an expected pattern. This signal can be used, for example, to interrupt the Video Processor 120 so that is may record the RAM address where the current digital sample is being stored. This RAM address establishes an estimate where the alignment pattern is likely to be, and provides a starting point for the autocorrelation-based search described above. Other variations may be used without departing from the present invention.

2. Reconstruction Filter

After the position of one or more alignment patterns has been determined, the reconstruction filter 62 increases the resolution of the image representation in the neighborhood of each fixel by applying a two-dimensional interpolating or reconstruction filter to the image at each expected fixel center. It is desirable to determine whether a fixel is transmissive or opaque by examining the amount of light transmitted at the fixel center. Because of the low oversampling rate, in general no sample will have been taken at the fixel center. By using reconstruction filters to increase the resolution of the image, however, it is possible to predict what a sample at a fixed center would have been had it actually been taken.

This prediction is accomplished by a two-dimensional reconstruction filter which upsamples the image representation. A virtual times-four upsampling of the samples is achieved by interpolating a value from the samples in the image representation which are nearest the expected fixel center. Virtual upsampling provides samples close to where the fixel is centered rather than wherever the samples happened to have been taken.

This virtual times-four upsampling increases the effective sampling rate to 1024 samples per interperf area in both the horizontal and vertical dimensions. The effect of such upsampling can be viewed as image enhancement which yields an image representation of sufficient resolution to provide a sample no farther away from a fixel center than about 8 to 10% of the fixel size. Empirical results show that this resolution is sufficient to accurately recover digital information under substantially all film conditions such as film weave, warpage, and minor surface defects caused by normal wear.

Alternatively, embodiments using other hardware components may be able to avoid reconstruction filtering by oversampling at a rate of 1024 samples per interperf area in both the horizontal and vertical dimensions rather than at only 256 samples per interperf area. As noted above, however, it still may be desirable to provide some filtering in order to smooth the resulting image.

The preferred embodiment does not filter all samples in the image representation; it reduces the amount of processing required by filtering only those samples near an expected fixel center. The interpolation or upsampling for each fixel is achieved by selecting one filter from a set of sixteen 3-by-3 two-dimensional reconstruction filters, and applying the selected filter to the nine samples nearest each expected fixel center. The choice of which filter to use from the set of sixteen depends upon the offset between the expected fixel center and the nearest sample in the image representation.

Each of the sixteen 3-by-3 two-dimensional reconstruction filters is a nonsymmetrical filter with a builtin phase shift for either or both of two dimensions in increments of one-quarter of the interval between samples. A reconstruction filter RF(ij) is constructed by cross-multiplying two three-point one-dimensional filters F(i)·F(j), where 0≦i<4 and 0≦j<4, and where i and j each represent the amount of quarter-sample shift in one of two dimensions. These filters are very analogous to the sixteen quarter-phase known patterns discussed above. Each of the one-dimensional filters is derived from a symmetric twelve-point FIR filter, the coefficients of which are shown in Table I.

TABLE I

Filter Coefficients for Twelve-Point FIR Filter

| | | |
|---|---|---|
| $\alpha_0 = -.0682344$ | $\alpha_4 = 0.689112$ | $\alpha_8 = 0.459192$ |
| $\alpha_1 = 0.02907564$ | $\alpha_5 = 0.829184$ | $\alpha_9 = 0.2162036$ |
| $\alpha_2 = 0.2162036$ | $\alpha_6 = 0.829184$ | $\alpha_{10} = 0.02907564$ |
| $\alpha_3 = 0.459192$ | $\alpha_7 = 0.689112$ | $\alpha_{11} = -.0682344$ |

Filter F(0) comprises coefficient $a_0$, $a_4$, and $a_8$; filter F(1) comprises coefficients $a_1$, $a_5$, and $a_9$; filter F(2) comprises coefficients $a_2$, $a_6$, and $a_{10}$; and filter F(3) comprises coefficients $a_3$, $a_7$, and $a_{11}$.

3. Adaptive Equalization

As discussed above, accurate determination of whether a fixel is transmissive or opaque may be hindered by intersymbol interference. The adapting equalization 64 performs additional digital filtering, referred to herein as equalization, which may reduce and ideally may eliminate intersymbol interference. In the preferred embodiment of the present invention as shown in FIG. 9, equalization adapts in response to the output of both the adapting equalization 64 and the adaptive threshold 66.

Conceptually, an array of upsampled data at the fixel or symbol centers if filtered by an equalization filter to minimize intersymbol interference. The equalizer is implements by a two-dimensional FIR filter represented by $$Q_m(x,y) = \sum_{i=\frac{-Lx+1}{2}}^{\frac{Lx-1}{2}} \sum_{j=\frac{-Ly+1}{2}}^{\frac{Ly-1}{2}} C(i,j) \cdot D_m(x+i, y+j) \quad (2)$$

where

C(ij)=equalizer filter coefficient for tap (ij), $D_m(x,y)$=upsampled data for symbol at position (x,y) in field m, $Q_m(x,y)$=equalizer output for symbol at position (x,y) in field m, Lx=length of equalizer filter (number of taps) in the x dimension, and Ly=length of equalizer filter (number of taps) in the y dimension.

In an embodiment of the present invention in which the digital information is represented by an orthogonal array of symbols, a basic equalization filter may be implemented by a sparse 5-tap two-dimensional FIR digital filter comprising a center tap for the recovered symbol and four adjacent taps, one tap for each of the four immediately adjacent symbols. The filter coefficient C(0,0) corresponds to the center tap.

In one embodiment of the present invention described above for recovery of digital information from motion picture film stock using an equalizer with fixed-value coefficient, each filter-tap coefficient other than C(0,0) may assume a value within a range substantially from 0.1 to 0.3, in which a value of 0.135 is generally optimum. The value for coefficient C(0,0) is 1.

In the preferred embodiment of the present invention, however, an adaptive equalizer optimizes the accuracy of the recovered digital information by adjusting its filter-tap coefficients to minimize intersymbol interference. The amount of intersymbol interference is measured by the cross-correlation scores of the equalizer output for each field with a threshold representation of the field.

The thresholded representation is obtained according to $$T_m(x,y) = \begin{bmatrix} +1 & \text{if } Q_m(x,y) \geq TH, \\ -1 & \text{otherwise,} \end{bmatrix} \quad (3)$$

where $T_m(x,y)$=threshold representation of symbol at position (x,y) infield m, and TH=threshold for determining the thresholded representation.

The establishment of threshold TH is discussed below in more detail.

The cross-correlation score of the equalizer output and the thresholded representation used to measure the amount of intersymbol interference is established according to $$S_m(h,v) = \sum_{x=0}^{Nx} \sum_{y=0}^{Ny} Q_m(x,y) \cdot T_m(h+x, v+y) \quad (4)$$

where

Nx=number of symbols in a field in the x dimension,

Ny=number of symbols in a field in the y dimension, and $S_m(h,v)$=cross-correlation score at offset (h,v) for field m.

In an embodiment of the adaptive equalizer implemented by the 5-tap FIR filter discussed above, each filter-tap coefficient dominates only one cross-correlation score. Hence, the number of useful cross-correlation scores equals the number of filter taps minus one.

It is possible to fix the value of coefficient C(0,0) at one. The remaining coefficients are adjusted adaptively according to cross-correlation scores. A cross-correlation score taking to one side of the current sample, for example, measures the amount by which the current symbol smears to that side. It is assumed that the symbol on the opposite side of the current symbol smears into the current symbol by the same amount, therefore the cross-correlation score on one side is used to adjust the FIR filter tap coefficient on the opposite side. In general, the cross-correlation score of equalizer filter tap (x,y) is used to adjust the coefficient corresponding to filter tap (−x,−y), that is, the filter tap mirrored about the center tap from the cross-correlation score tap.

If the array of symbols carrying the digital information in each field is known to have good autocorrelation properties, that is, a very low autocorrelation score for all offsets except (0,0), then intersymbol interference can be minimized by adapting the equalizer filter coefficients until the cross-correlation scores of the equalizer output with the thresholded data are zero. A basic implementation of adaptive equalization is discussed first under the assumption that each field has very good autocorrelation properties. After this basic implementation is introduced, a more general implementation of the adaptive equalization filter is discussed.

If sufficient processing power is available, it is possible to calculate all cross-correlation scores and adjust all equalization filter-tap coefficients for each field of symbols. In one practical implementation of the present invention, however, only enough processing power is available to calculate one cross-correlation score for every second field. It therefore becomes necessary to utilize the cross-correlation scores for a series of fields. Presumably, each field experiences similar amount of image degradation; hence, it should be possible to adapt filter-tap coefficients and converge to an optimal solution by calculating one cross-correlation score for every second field.

Adjustment of filter-tap coefficients is accomplished by subtracting a fraction of each normalized cross-correlation score from the corresponding equalizer filter tap. Each cross-correlation score is normalized by dividing it by the score S(0,0). Normalization eliminates dependence upon various factors such the range of values in the equalizer output representing symbols, and the number of symbols comprising a field. Thus, filter-tap coefficients are adjust according to $$C_{m+1}(i,j) = C_m(i,j) - f \cdot \frac{S_m(-i,-j)}{S(0,0)} \quad (5)$$

where f=convergence factor.

The value for the factor f must be large enough to provide sufficiently rapid convergence, yet not too large to cause instability in convergence due to variations in the upsampled data amplitudes encountered between fields of symbols. Empirical evidence suggest the factor f may assume any value within the range between 0.002 and 0.02 in the preferred embodiment. The preferred value is 0.0625.

Convergence is achieved for a particular equalizer filter-tap coefficient when its corresponding correlation score is zero, thus indicating that smearing or intersymbol interference is cancelled.

In general, contrary to the assumption made above for the sake of discussion, each field does not necessarily gave good autocorrelation properties. Adaptive equalization can compensate by determining the actual autocorrelation properties of each field. In implementations which do not have sufficient processing power to perform such calculations for each field, it become necessary to calculate the autocorrelation scores for a series of field. Presumably, each field possesses similar characteristics; hence, the preferred embodiment of the present invention establishes an average set of autocorrelation scores by calculating one autocorrelation score for every second field.

Autocorrelation characteristics may be determined from the threshold representation of the digital information according to $$M(i,j) = \sum_{x=0}^{Nx} \sum_{y=0}^{Ny} T_m(x,y) \cdot T_m(x+i, y+j). \quad (6)$$

Because of the special properties of the T matrix, i.e., the absolute value of all T matrix elements is one, the autocorrelation value M(0,0) is constant and equal to the product Nx·Ny. In an embodiment of the present invention with a field comprising a 76-by-76 array of symbols, M(0,0)= 76·76=5776.

By using normalized autocorrelation scores, equalization filter-tap coefficients may be adjust without regard for variations in autocorrelation properties including the size of the array of symbols, that is, the value of M(0,0). Coefficients are adjust according to $$C_{m+1}(i,j) = C_m(i,j) - f \cdot \left[ \frac{S_m(-i,-j)}{S(0,0)} - \frac{M(-i,-j)}{M(0,0)} \right]. \quad (7)$$

It should be appreciated that implementations of the present invention using limited processing power cannot calculate autocorrelation and cross-correlation for every field.

An alternative embodiment of an optical-storage medium which carries symbols with nonuniform density may reduce or eliminate intersymbol interference, thereby reducing or eliminating the need for equalization filtering. For example, FIG. 5 is a hypothetical graphical illustration of the optical transmissivity of three abutting symbols A, B, and C, along a line which passes through their centers. Symbol A is opaque, and symbols B and C are transmissive. The transmissivity characteristics of each symbol is nonuniform, varying as a raised sinusoid which is a function of distance from the symbol center.

Symbols such as those represented in FIG. 5 require less equalization filtering because the transitions between such symbols of opposite type have greatly reduced high-order harmonics. Transitions between uniform symbols, on the other hand, possess much more significant high-order harmonics.

4. Adaptive Threshold

After the image representation in the RAM 52 has been enhanced by the reconstruction filter 62 and the adaptive equalization 64, the adaptive threshold 66 compares the amount of light transmitted at or near the fixel centers with a threshold value to determine whether a fixel is transmissive or opaque. In effect, the adaptive threshold 66 translates 8-bit values representing shades of grey within the image representation at the fixel centers into a binary representation. This is done by selecting one or more thresholds and applying them against the 8-bit values. Such thresholds may be dynamically altered to track the transmissivity of the film, the brightness of the illuminating, density of the symbols, and other optical variations.

In the preferred embodiment of the present invention, an automatic gain control (AGC) normalizes the 8-bit values so that zero corresponds to opacity or not transmissivity, and 255 corresponds to transparency or complete transmissivity. The low end of the range is established by the DC clamp 42 which clamps the "black-level" output of the CCD 30 to DC. The high end of the range is established by means not shown in FIG. 8 which adjust the reference voltage of the 8-bit ADC 44 to achieve a digital output of 255 during intervals when the CCD 30 is receiving light through the sprocket perforations. An alternate form of AGC may be implemented digitally by scaling the output of the ADC 44, particularly if an ADC with a resolution greater than 8 bits is used.

In one embodiment of the present invention described above for recovery of digital information from motion picture film stock, equalizer output for each fixel falls within a rage substantially from −0.5, which represents an opaque fixel, to +0.5, which represents a transmissive fixel. Values at the equalizer output representing the fixels ideally should cluster tightly around these two values, but because the optical characteristics of transmissive fixels are generally corrupted more than those of opaque fixels by effects such as film wear and dirt,the sample values of opaque fixels tend to cluster more tightly than those for transmissive fixels. As a result, for embodiments of the invention using a fixed-value threshold, the value for threshold TH is preferably selected somewhere between the mid-point of the representation range and the end of that range representing opaque fixels.

Figure 11:
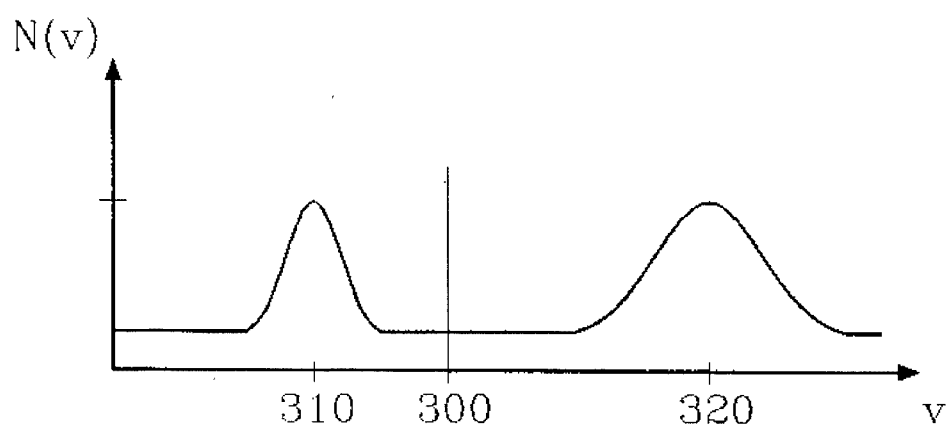
FIG. 11 is a hypothetical graphical representation showing the distribution of optical samples for the symbols in a block of symbols, and a threshold by which the binary value of the information represented by each symbol may be determined.

FIG. 11 illustrates a hypothetical distribution of the symbol values representing the fixels at the equalizer output, referred to here as the "fixel values." The fixel value 310 is the means value for fixels which are opaque. The fixel value 320 is the mean value for fixels which are transmissive or clear. The threshold is represented by the line 300.

Empirical evidence has shown that a fixed-value threshold within a range substantially from −0.2 to 0.0 gives good results. A threshold equal to −0.1 is generally optimum. The preferred embodiment of the present invention, however, uses an adaptive-value threshold described below in more detail.

In yet another embodiment, the determination of whether a fixel is transmissive or opaque may be accomplished by comparing the 8-bit values representing each fixel against two distinct thresholds; those values which exceed threshold a first threshold T1 are classified as representing a binary one, those values which fall below threshold a second threshold T2, where T2 is lower than T1, are classified as representing a binary zero, and those values which fall in between thresholds T1 and T2 are classified as an error or "erasure." Erasure information may be used advantageously by the EDC 68 discussed below.

When a foreign particle such a dirt covers up some fixels, those fixels appear to be opaque, all representing binary zeros. When scrapes or defects in the film development process occur, fixels within the scrape or defect appear to be transmissive, all representing binary ones. Because the data recorded on the film is preferably randomized, it is unlikely that large opaque or transmissive areas will occur other than when a foreign particle or other defect corrupts the digital film information. Accordingly, the thresholding function may recognize these areas as uncertain values rather than as zeros or ones.

In the preferred embodiment of the present invention, an adaptive threshold is established in response to the output of the adaptive equalization 64. The adaptive threshold 66 calculates a histogram of fixel values. If sufficient processing power is available, it is possible to calculate the histogram for each field of symbols. In one practical implementation, however, the histogram is calculated in two pieces; and exponentially decaying average similar to that shown above in equation 1 is calculated for each of two portions of the histogram. More specifically, the average for each portion is calculated every fourth field, and the decay factor E if 0.08.

After establishing the histogram, the adaptive threshold 66 selects an intermediate fixel value, say zero, finds the histogram peak below the intermediate value to determine an "opaque fixel value," and finds the histogram peak above the intermediate value to determine a "clear fixel value." Starting at the opaque fixel value, the adaptive threshold 66 searches up to the clear fixel value to find a "first minimum" fixel value corresponding to the minimum histogram level. If the minimum histogram level occurs for more than one fixel value, the highest of such fixel values is used. The adaptive threshold 66 then starts at the clear fixel value and searches down to the opaque fixel value to find a "second minimum" fixel value corresponding to the minimum histogram level. If the minimum histogram level occurs for more than one fixel value, the lowest of such fixel values is used. Finally, the adaptive threshold 66 calculates a decaying average similar to that shown above in equation 1 for the threshold TH using the average of the first minimum and the second minimum fixel values as the X value, and a decay factor E of 0.08.

The adaptive threshold 66 generates a binary value for each symbol in the image representation and stores the binary values in the RAM 52. The RAM 52 is not shown in FIG. 9. A one is generated for each symbol value which exceeds the threshold, and a zero is generated for each symbol value which does not exceed the threshold.

5. Error Detection/Correction

In the preferred embodiment of the present invention, the EDC 68 is implemented in a fairly conventional manner as a microcode controlled state machine which drives a Reed-Solomon error detection/correction chip number AHA4010-01 manufactured by Advanced Hardware Architectures (AHA) of Moscow, Id., United States of America. In principle, the EDC 68 can be implemented with a very fast general purpose digital processor, but such processors are expensive. A state machine architecture provides an economical implementation with sufficient processing speed.

In the preferred embodiment, the binary information received from the adaptive threshold 66 contains two levels of protection. The first level of protection is provided by "inner" EDC codes. The second level of protection is provided by "outer" EDC codes. The EDC 68 passes the binary data store din the RAM 52 to the AHA chip for processing of the outer EDC codes, stores the results in the RAM 52, subsequently passes these results through the AHA chip a second time to process the "inner" EDC codes, and stores the "corrected information" in the RAM 52.

D. Audio Signal Processor

Figure 12:
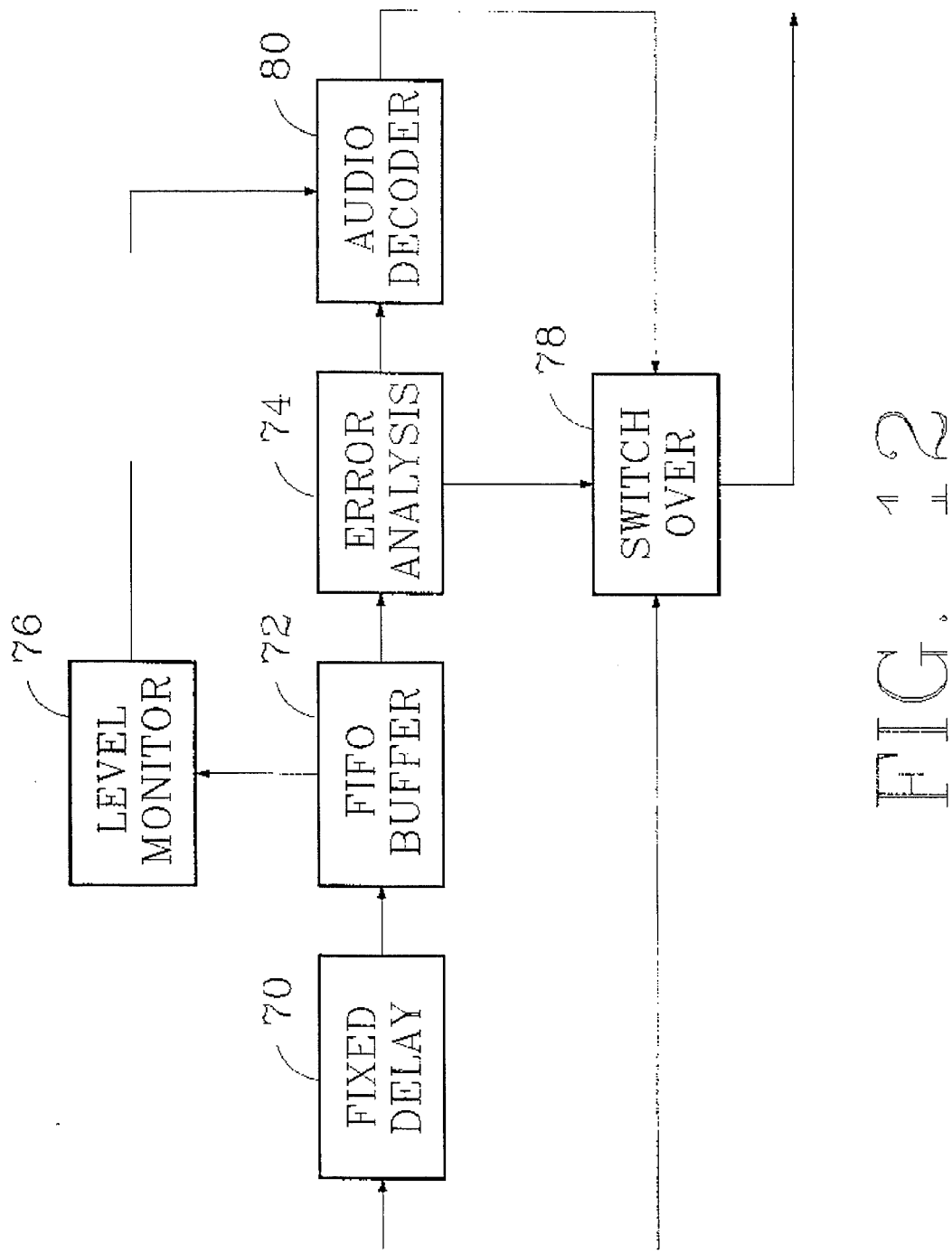
FIG. 12 is a functional block diagram of the Audio Signal Processor portion of a motion picture film soundtrack playback system which includes the present invention.

FIG. 12 is a functional block diagram showing a preferred embodiment of the Audio Signal Processor 160. The fixed delay 70 delays the corrected binary data to provide for installation-dependent adjustments to synchronize playback of the digital soundtrack with the picture portion of motion picture film. These adjustments are required by variations in acoustic delays of different motion picture theaters, and by variations in the location of the optical sensor on the motion picture projector relative to the lens. The first-in-first-out (FIFO) buffer 72 receives corrected binary data from the fixed delay 70 and stores it. The error analysis 74 analyzes the corrected binary data stored in the FIFO buffer 72 to determine whether it contains any uncorrected errors, thus making the information unsuitable for motion picture film soundtrack playback. As a result of the analysis, each block of data corresponding to a field of fixels is marked as either a "good" data block or a "bad" data block. The audio decoder 80 receives blocks of corrected binary data along with an indication whether each block is good or bad, and decodes the binary information into a series of digital signals suitable for generating an analog audio signal. The level monitor 76 tracks the amount of data currently stored in the FIFO buffer 72 and adjust the operating speed of the audio decoder 80 to conform to the average rate at which the binary data is received by the buffer. The switch over 78 switches to the conventional analog soundtracks whenever the error analysis 76 detects too many bad blocks.

1. Error Analysis and Switch Over

The error analysis 74 determines whether the binary information stored in the FIFO buffer 72 contains any errors which could not be corrected by the EDC 68. If uncorrectable errors are present, the error analysis 74 marks the entire block of binary information as a bad data block. This indication is passed along with the data to the audio decoder 80, and it is passed to the switch over 78.

If too many bad data blocks are encountered, the switchover 78 selects an alternate signal for film soundtrack playback by switching from the output of the audio decoder 80 to the signal obtained from the conventional analog soundtrack. In one embodiment of the present invention, a counter is incremented from zero up to seven for each bad data block encountered, and that counter is decremented down to zero for each good data block encountered. A switch over to the analog soundtrack occurs while the counter has a value of three or more. Many other switch over schemes are possible without departing from the scope of the present invention.

2. Audio Decoder

The audio decoder 80 comprises a decoding means and means such a digital-to-analog converter (DAC) for generating one or more analog signals in response to good data blocks received from the FIFO buffer 72. If a bad data block is received, the audio decoder 80 attempts to conceal the error by repeating the last received good data block. If too many bad data blocks are received, the audio decoder 80 mutes its output. In the preferred embodiment of the present invention, the audio decoder 80 increments a counter from zero up to seven for each bad data block encountered, and decrements that counter down to zero for each good data block encountered. The last good data block is repeated while the counter has a value from one to three, and the output is muted for values greater than three.

Many other muting and error concealing schemes are possible without departing from the present invention. Preferably, the output of the audio decoder 80 mutes simultaneously with or immediately prior to the switch over to the analog soundtrack by the switch over 78.

Details of implementation for the decoding means of the audio decoder 80 are beyond the scope of the present invention.

3. FIFO Buffer Level Monitor

The level monitor 76 regulates the operating speed of the audio decoder 80 to conform to the average rate at which corrected binary data is stored in the FIFO buffer 72. If the average operating speed of the audio decoder 80 is too low, the FIFO buffer 72 will overflow. If the average operating rate of the audio decoder 80 is too high, the FIFO buffer 72 will be unable to provide the decoder with the information it requires to continue generating audio signals.

The rate at which binary data is stored into the FIFO buffer 72 is very uneven because the output of the ADC 44 occurs in bursts of digital data with a duty cycle of approximately 50%; however, the audio decoder 80 must operate at a very smooth rate to avoid generating objectionable audible artifacts. The level monitor 76 adjusts the operating speed of the audio decoder 80 by generating a clock signal whose frequency is a function of the fullness level of the FIFO buffer 72. Preferably, the level monitor 76 can provide a range of from approximately −7% to approximately +11% of the nominal rate required to decode fields scanned at a rate of 96 Hz.

In the preferred embodiment of the present invention, the level monitor 76 is a variable frequency synthesizer comprising a high-frequency PLL circuit with a crystal reference for frequency stability, and a variable frequency divider. An example of a device providing such a function is chip number DP8531 manufactured by National Semiconductor Corp. of Santa Clara, Calif. United States of America. As the fullness of the FIFO buffer 76 increases, the divisor of the frequency divider is decreased, thereby increasing the frequency of the clocking signal for the audio decoder 80. As the fullness of the FIFO buffer decreases, the divisor is increased to reduce the clocking frequency. The clock signal controls the operating speed of the audio decoder 80 by driving one or more DAC which request decoded digital data from the decoding means. The decoding means in turn request information from the FIFO buffer 72 by way of the error analysis 74.

It should be noted that conventional voltage-controlled oscillators are not suitable for controlling the audio decoder 80 because they generate a clock signal which has too much phase jitter.

We claim:

1. An apparatus for recovering symbols carried by an information storage medium carrying two or more blocks of differentiable symbols representing digital information, the symbols of each block being two-dimensionally encoded, said apparatus comprising sampling means for oversampling in two dimensions said storage medium to produce samples, processing means for storing said samples to successively obtain for each block a two-dimensional image representation and for generating recovered symbols from each two-dimensional image representation, and means for forming a continuous data stream from the symbols recovered from two or more blocks.

2. An apparatus according to claim 1 wherein said processing means includes means for determining symbol locations in said two-dimensional image representation using positional references, said positional references being established from positional information obtained from said two-dimensional image representation.

3. An apparatus according to claim 2 wherein said positional information is established from the determined and/or estimated location of one or more alignment patterns.

4. An apparatus according to claim 3 further comprising locating means for determining the position of a two-dimensional alignment pattern within said two-dimensional image representation, said locating means comprising reference means for storing a first known pattern, means for calculating first cross-correlation scores between samples in said two-dimensional image representation and said first know pattern, and means for finding the peak first cross-correlation score.

5. An apparatus according to claim 4 wherein said first known pattern is formed from the cross-multiplication of one or more Barker codes.

6. An apparatus according to claim 4 further comprising means for refining the determined position of said two-dimensional alignment pattern, said means comprising means for storing one or more second known patterns, each of said second known patterns representing the expected recovered symbol values for said two-dimensional alignment pattern shifted by an interval in either or both dimensions between samples, means for calculating second cross-correlation scores between samples in said two-dimensional image representation and said one or more second known patterns, and means for finding the peak of said second cross-correlation scores.

7. An apparatus according to claim 2 wherein said positional references are established by interpolating between locations defined by said positional information.

8. An apparatus according to claim 1 wherein said processing means further comprises means for reconstruction filtering to enhance the two-dimensional image representation.

9. An apparatus according to claim 1 wherein said processing means further comprises means for minimizing intersymbol interference by filtering said two-dimensional image representation with a filter the characteristics of which are adapted in response to the amount of intersymbol interference measured in said two-dimensional image representation.

10. An apparatus according to claim 1 further comprising means for generating a digital representation for each of said recovered symbols by comparing the value of each of said recovered symbols to one or more thresholds, said means comprising means for adapting said one or more thresholds in response to statistical characteristics of said recovered symbol values.

11. An apparatus according to claim 1 further comprising means for maximizing the dynamic range of said recovered samples.

12. An apparatus according to claim 1 further comprising means for determining digital values represented by said recovered symbols, means for storing said digital values in a buffer, output means for removing digital values from said buffer, means for generating a measure-of-fullness of said buffer, and means responsive to said measure-of-fullness for adjusting the processing speed of said output means whereby the average processing speed of said output means follows the average processing speed of said sampling means.

13. An apparatus for recovering symbols carried by information storage medium representing digital information, comprising sampling means for oversampling in two dimensions said storage medium to produce samples, and processing means for storing said samples to obtain a two-dimensional image representation and for generating recovered symbols from said two-dimensional image representation, wherein said processing means includes means for determining symbol locations in said two-dimensional image representation using positional references established by interpolating between locations defined by said positional information.

14. An apparatus for recovering symbols carried by an information storage medium representing digital information, comprising sampling means for oversampling in two dimensions said storage medium to produce samples, processing means for storing said samples to obtain a two-dimensional image representation and for generating recovered symbols from said two-dimensional image representation, and locating means for determining the position of a two-dimensional alignment pattern within said two-dimensional image representation, said locating means comprising reference means for storing a first known pattern, means for calculating first cross-correlation scores between samples in said two-dimensional image representation and said first known pattern, and means for finding the peak first cross-correlation score.

15. An apparatus according to claim 14 wherein said first known pattern is formed from the cross-multiplication of one or more Barker codes.

16. An apparatus according to claim 15 further comprising means for refining the determined position of said two-dimensional alignment pattern, said means comprising means for storing one or more second known patterns, each of said second known patterns representing the expected recovered symbol values for said two-dimensional alignment pattern shifted by an interval in either or both dimensions between samples, means for calculating second cross-correlation scores between samples in said two-dimensional image representation and said one or more second known patterns, and means for finding the peak of said second cross-correlation scores.

17. An apparatus according to claim 14 further comprising means for refining the determined position of said two-dimensional alignment pattern, said means comprising means for storing one or more second known pattern, each of said second known patterns representing the expected recovered symbol values for said two-dimensional alignment pattern shifted by an interval in either or both dimensions between samples, means for calculating second cross-correlation scores between samples in said two-dimensional image representation and said one or more second known patterns, and means for finding the peak of said second cross-correlation scores.

18. An apparatus for recovering symbols carried by an information storage medium representing digital information, comprising
   sampling means for oversampling in two dimensions said storage medium to produce samples, and
   processing means for storing said samples to obtain a two-dimensional image representation and for generating recovered symbols from said two-dimensional image representation, wherein said processing means further comprises means for reconstruction filtering to enhance the two-dimensional image representation.

19. An apparatus for recovering symbols carried by an information storage medium representing digital information, comprising
   sampling means for oversampling in two dimensions said storage medium to produce samples, and
   processing means for storing said samples to obtain a two-dimensional image representation and for generating recovered symbols from said two-dimensional image representation, wherein said processing means further comprises means for minimizing intersymbol interference by filtering said two-dimensional image representation with a filter the characteristics of which are adapted in respond to the amount of intersymbol interference measured in said two-dimensional image representation.

20. An apparatus for recovering symbols carried by an information storage medium representing digital information, comprising
   sampling means for oversampling in two dimensions said storage medium to produce samples,
   processing means for storing said samples to obtain a two-dimensional image representation and for generating recovered symbols from said two-dimensional image representation, and
   means for generating a digital representation for each of said recovered symbols by comparing the value of each of said recovered symbols to one or more thresholds, said means comprising means for adapting said one or more thresholds in response to statistical characteristics of said recovered symbol values.

21. An apparatus for recovering symbols carried by an information storage medium representing digital information, comprising
   sampling means for oversampling in two dimensions said storage medium to produce samples,
   processing means for storing said samples to obtain a two-dimensional image representation and for generating recovered symbols from said two-dimensional image representation, and
   means for maximizing the dynamic range of said recovered samples.

22. An apparatus for recovering symbols carried by an information storage medium representing digital information, comprising
   sampling means for oversampling in two dimensions said storage medium to produce samples,
   processing means for storing said samples to obtain a two-dimensional image representation and for generating recovered symbols from said two-dimensional image representation,
   means for determining digital values represented by said recovered symbols,
   means for storing digital values in a buffer,
   output means for removing digital values from said buffer,
   means for generating a measure-of-fullness of said buffer, and
   means responsive to said measure-of-fullness for adjusting the processing speed of said output means whereby the average processing speed of said output means follows the average processing speed of said sampling means.

23. An apparatus for recovering symbols carried by an information storage medium, said apparatus comprising
   sampling means for producing samples by oversampling in two dimensions said storage medium carrying two or more blocks of said symbols representing digital information, said symbols of each block being two-dimensionally encoded,
   processing means for storing said samples to successively obtain for each block a two-dimensional image representation and for generating recovered symbols from each two-dimensional image representation, and
   means for forming a continuous data stream from the symbols recovered from two or more blocks.

24. An apparatus according to claim 23 wherein said processing means includes means for determining symbol locations in said two-dimensional image representation using positional references, said positional references being established from positional information obtained from said two-dimensional image representation.

25. An apparatus according to claim 24 wherein said positional information is established from the determined and/or estimated location of one or more alignment patterns.

26. An apparatus according to claim 25 further comprising locating means for determining the position of a two-dimensional alignment pattern within said two-dimensional image representation, said locating means comprising
   reference means for storing a first known pattern,
   means for calculating first cross-correlation scores between samples in said two-dimensional image representation and said first known patter, and
   means for finding the peak first cross-correlation score.

27. An apparatus according to claim 26 wherein said first known pattern is formed from the cross-multiplication of one or more Barker codes.

28. An apparatus according to claim 26 further comprising means for refining the determined position of said two-dimensional alignment pattern, said means comprising
   means for storing one or more second known patterns, each of said second known patterns representing the expected recovered symbol values for said two-dimensional alignment pattern shifted by an interval in either or both dimensions between samples,
   means for calculating second cross-correlation scores between samples in said two-dimensional image representation and said one or more second known patterns, and
   means for finding the peak of said second cross-correlation scores.

29. An apparatus according to claim 24 wherein said positional references are established by interpolating between locations defined by said positional information.

30. An apparatus according to claim 23 wherein said processing means further comprises means for reconstruction filtering to enhance the two-dimensional image representation.

31. An apparatus according to claim 23 wherein said processing means further comprises means for minimizing intersymbol interference by filtering said two-dimensional image representation with a filter the characteristics of which are adapted in response to the amount of intersymbol interference measured in said two-dimensional image representation.

32. An apparatus according to claim 23 further comprising means for generating a digital representation for each of said recovered symbols by comparing the value of each of said recovered symbols to one or more thresholds, said means comprising means for adapting said one or more thresholds in response to statistical characteristics of said recovered symbol values.

33. An apparatus according to claim 23 further comprising means for maximizing the dynamic range of said recovered samples.

34. An apparatus according to claim 23 further comprising means for determining digital values represented by said recovered symbols, means for storing said digital values in a buffer, output means for removing digital values from said buffer, means for generating a measure-of-fullness of said buffer, and means responsive to said measure-of-fullness for adjusting the processing speed of said output means whereby the average processing speed of said output means follows the average processing speed of said sampling means.

* * * * *